(12) United States Patent
Hinterkausen et al.

(10) Patent No.: US 11,247,749 B2
(45) Date of Patent: Feb. 15, 2022

(54) DRIVE ASSEMBLY AND VEHICLE

(71) Applicant: Robert Bosch GmbH, Stuttgart (DE)

(72) Inventors: Markus Hinterkausen, Moeglingen (DE); Peter Kimmich, Steinenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 435 days.

(21) Appl. No.: 16/329,605

(22) PCT Filed: Jul. 14, 2017

(86) PCT No.: PCT/EP2017/067797
§ 371 (c)(1),
(2) Date: Feb. 28, 2019

(87) PCT Pub. No.: WO2018/041460
PCT Pub. Date: Mar. 8, 2018

(65) Prior Publication Data
US 2019/0193812 A1 Jun. 27, 2019

(30) Foreign Application Priority Data
Sep. 1, 2016 (DE) ..................... 10 2016 216 557.7

(51) Int. Cl.
*B62M 11/06* (2006.01)
*B62M 6/55* (2010.01)
(Continued)

(52) U.S. Cl.
CPC .............. *B62M 6/55* (2013.01); *B62M 11/06* (2013.01); *B62M 11/145* (2013.01); *B62M 11/18* (2013.01); *F16H 37/065* (2013.01)

(58) Field of Classification Search
CPC ...... B62M 6/55; B62M 11/06; B62M 11/145; B62M 11/18; F16H 37/065
See application file for complete search history.

(56) References Cited

FOREIGN PATENT DOCUMENTS

DE 1049714 B 1/1959
DE 102007004802 A1 7/2008
(Continued)

OTHER PUBLICATIONS

International Search Report for PCT/EP2017/067797, dated Nov. 10, 2017.
https://www.heise.de/autos/artikel/honda-bringt-doppelkup-plungsgetriebe-fuer-motorraeder-738715.html.

*Primary Examiner* — Justin Holmes
(74) *Attorney, Agent, or Firm* — Norton Rose Fulbright US LLP; Gerard Messina

(57) ABSTRACT

A drive assemblage is described for a vehicle drivable by muscle energy and/or—in particular additionally—by motor energy, to an electric bicycle, e-bike, or pedelec, having: a crank spindle rotatable around a rotation axis for receiving a first torque that is generated in particular by muscle energy; and a transfer device that is embodied to transfer the first torque from the crank spindle to an output drive element couplable to a drive wheel of the vehicle, and is embodied, by way of an—in particular automatically—shiftable spur gear transmission, for a variable conversion ratio, in which: the spur gear transmission has a first shiftable spur gear transmission and a second shiftable spur gear transmission separate therefrom; the first shiftable spur gear transmission and the second shiftable spur gear transmission have a common transmission output to the couplable output drive element; and the first shiftable spur gear transmission and the second shiftable spur gear transmission are couplable alternatingly and alternatively into the power and torque flow of the transfer device.

18 Claims, 16 Drawing Sheets

(51) Int. Cl.
    *B62M 11/14*        (2006.01)
    *B62M 11/18*        (2006.01)
    *F16H 37/06*        (2006.01)

(56)            References Cited

FOREIGN PATENT DOCUMENTS

| DE | 102008035317 A1 * | 1/2010  | .......... B62M 11/145 |
| DE | 102008064514 A1   | 7/2010  |                        |
| DE | 102009060484 A1 * | 6/2011  | ............ B62M 11/06 |
| DE | 102010051727 A1   | 5/2012  |                        |
| DE | 102011106107 A1   | 12/2012 |                        |
| DE | 102013113524 A1 * | 6/2015  | .............. B62M 6/55 |
| DE | 102013113524 A1   | 6/2015  |                        |
| DE | 202015105010 U1   | 9/2015  |                        |
| EP |       3028934 A1  | 6/2016  |                        |
| FR |        614981 A   | 12/1926 |                        |
| WO | WO-9852817 A1 *   | 11/1998 | ............ B62M 11/18 |

* cited by examiner

DRIVE ASSEMBLY AND VEHICLE

FIELD OF THE INVENTION

The present invention relates to a drive assemblage and to a vehicle. The present invention relates in particular to a drive assemblage of a vehicle drivable by muscle energy and/or—if applicable, additionally—by motor energy, of an electric bicycle, e-bike, or pedelec; and to a vehicle drivable by muscle energy and/or—if applicable, additionally—by motor energy, to an electric bicycle, e-bike, or pedelec as such.

BACKGROUND INFORMATION

Bicycles, electric bicycles, and the like are often embodied with a derailleur gear system or hub gear system on the driven rear wheel. Alternatively thereto, bottom-bracket drive systems having an integrated shiftable transmission can also be provided.

With known drive assemblages having shiftable transmissions disposed at the bottom bracket, the increased size and/or insufficient efficiency thereof is problematic. This relates in particular to friction ring transmissions, shiftable transmissions having a hollow shaft motor, or the like which are embodied on the bottom-bracket drive system. Further disadvantages of known drive assemblages are deficiencies in terms of shiftability under load, absence of interruptions in tractive energy, and the occurrence of "dead zones."

SUMMARY

In contrast thereto, the drive assemblage according to the present invention has the advantage that in the context of a comparatively small installation space in the region of the bottom bracket, torque transfer can be effected with comparatively high efficiency, i.e. with reduced losses, and moreover also under load and thus with no interruption in tractive energy and with particularly minor or even negligible dead zones. This is achieved according to the present invention by the fact that a drive assemblage is created for a vehicle drivable by muscle energy and/or—in particular additionally—by motor energy, in particular for an electric bicycle, e-bike, pedelec, or the like, having a crank spindle rotatable around a rotation axis for receiving a first torque that is generated in particular by muscle energy and having a transfer device that is embodied to transfer the first torque from the crank spindle to an output drive element couplable to a drive wheel of the vehicle, and is embodied, by way of an, in particular automatically, shiftable multi-stage spur gear transmission, for a variable conversion ratio. According to the present invention the spur gear transmission, which is also referred to as a "shiftable spur gear transmission," has a first shiftable spur gear transmission and a second shiftable spur gear transmission separate therefrom. The first shiftable spur gear transmission and the second shiftable spur gear transmission have a common transmission output to the couplable output drive element. According to the present invention, the first shiftable spur gear transmission and the second shiftable spur gear transmission are couplable alternatingly and alternatively into the power and torque flow of the transfer device.

In an advantageous refinement of the drive assemblage according to the present invention, for alternating and alternative coupling of the first shiftable spur gear transmission and the second shiftable spur gear transmission into the power and torque flow of the transfer device, a first coupling device is embodied to be associated with the first shiftable spur gear transmission and a second coupling device to be associated with the second shiftable spur gear transmission, in particular as part of the transfer device.

The first coupling device and the second coupling device can be actuatable independently of one another and can be conveyable at least into a first or coupled state and into a second or decoupled state.

When a respective coupling device is in the coupled state, the respectively associated shiftable spur gear transmission is coupled into the power and torque flow of the transfer device; and when the respective coupling device is in the decoupled state, the respectively associated shiftable spur gear transmission is decoupled from the power and torque flow of the transfer device.

Various dispositions of the respective coupling devices with respect to the power and torque flow of the transfer device, and in particular in relation to the output drive element of the underlying vehicle, are possible.

In an advantageous embodiment of the drive assemblage according to the present invention, for example, provision is made that a respective coupling device is disposed in the transfer device, with respect to the power and torque flow of the transfer device, on the input side of the transfer device and facing away from the output drive element, or on the output side and facing toward the output drive element.

The actual coupling of the sub-transmissions of the shiftable spur gear transmission, namely of the first shiftable spur gear transmission and the second shiftable spur gear transmission, in order to embody the variable conversion ratio of the transfer device, can be achieved using a variety of features.

According to a preferred embodiment of the drive assemblage according to the present invention, for example, provision is made that a respective coupling device has a planetary gearset or a part of a planetary gearset, and means for immobilizing a sun gear of the respective planetary gearset or of a part of a planetary gearset nonrotatably, in particular with respect to a housing of the drive assemblage, for power and torque transfer, in accordance with a coupled state of the coupling device; or for releasing it for free co-rotation with no power and torque transfer, in accordance with a decoupled state of the coupling device.

It can be advantageous if a respective coupling device has, for controlled immobilization and release of a sun gear of an underlying planetary gearset, an entrainer element coupled nonrotatably to the respective sun gear.

In a particularly reliable refinement of the drive assemblage according to the present invention, the entrainer element is embodied respectively on, or as a radially external or outermost portion of, a shifting finger coupled nonrotatably to the respective sun gear.

The structure of the entrainer element can thus be suitably configured, independently of the coupling to the sun gear, to particularly reliably perform a coupling or release of a sun gear.

In another advantageous embodiment of the drive assemblage according to the present invention, particularly reliable immobilization or release of a sun gear is made possible by the fact that such immobilization or release can be carried out by way of a positioning drive, in particular by way of a shift gate, radially spaced away with respect to the rotation axis of the crank spindle and/or of the sun gears and positionable in controlled axially parallel fashion, having a plurality of stop elements for the entrainer elements.

Additionally and alternatively, further measures can be taken in conjunction with the configuration of the first and second coupling devices.

For example, the alternating and alternative coupling of the first and second shiftable spur gear transmissions into the power and torque flow of the transfer device can be achieved with particularly simple means if, in accordance with another refinement of the drive assemblage according to the present invention, a respective coupling device has a clutch or is embodied as such, in particular in the manner of a friction clutch or a brake, and/or in interaction with an actuator for controlled actuation of the respective clutch, in particular in order to immobilize or release a respective sun gear of an underlying planetary gearset.

The present invention can be utilized not only in the context of vehicles operated exclusively by muscle energy, for instance with conventional bicycles, but in particular in the context of electric bicycles, e-bikes, pedelecs, or the like, as has already been mentioned above.

In a preferred embodiment of the drive assemblage according to the present invention, provision is therefore made that an electrical drive system is embodied to generate a motor torque; and that the electrical drive system is controllably couplable to the output drive element in order to transfer the motor torque via the shiftable spur gear transmission.

The coupling of the electrical drive system, and thus the transfer of motor torque from the motor shaft to the spur gear transmission, can be implemented in various ways, for instance with or without participation of a crank spindle embodied for reception and transfer of a torque generated by muscle energy.

In a preferred embodiment of the drive assemblage according to the present invention, provision is made for that purpose that a motor reduction transmission in the form of a multi-stage spur gear transmission is embodied between the electrical drive system and the shiftable spur gear transmission.

A construction that is particularly compact radially is produced if, in accordance with an alternative embodiment of the drive assemblage according to the present invention, a motor reduction transmission in the form of an evoloid transmission, which can be embodied in internally or externally toothed fashion, is embodied between the electrical drive system and the shiftable spur gear transmission.

Regardless of the manner in which the motor reduction transmission is otherwise configured, it is particularly advantageous if one, several, or all components of the respective motor reduction transmission are produced using, or from, a plastic material. Operating noise and/or transfer thereof in the drive assemblage can thereby be further reduced.

A drive assemblage that exhibits the configuration of a central-motor drive system, and in particular encompasses a common housing in which the transfer device, the spur gear transmission and in particular the first and the second shiftable spur gear transmission, coupling devices, the positioning drive, the electrical drive system, the motor reduction transmission, and/or at least in part the crank spindle, are received, is particularly preferred.

The present invention further relates to a vehicle drivable by muscle energy and/or—in particular additionally—by motor energy, and in particular to an electric bicycle, e-bike, pedelec, or the like. The vehicle according to the present invention has at least one wheel as well as a drive assemblage, embodied in according to the present invention, with which the at least one wheel of the vehicle is drivable.

DETAILED DESCRIPTION

Figure 1:
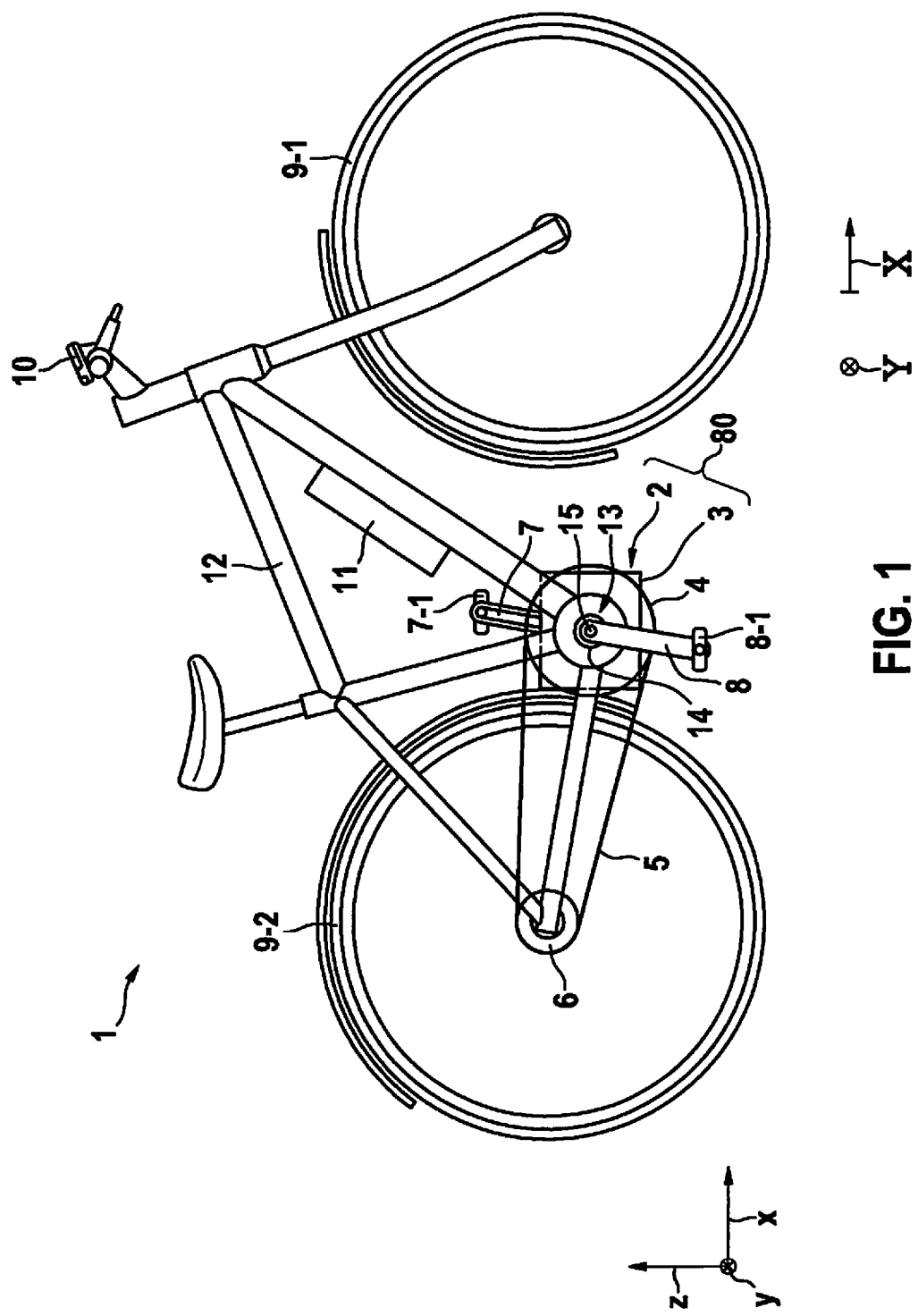
FIG. 1 schematically depicts an example of a vehicle, such as an electric bicycle, in which a first embodiment of the invention is implemented.

Exemplifying embodiments of the invention and its technical background will be described in detail below with references to FIGS. 1 to 16. Elements and components that are identical and equivalent and that function identically and equivalently are labeled with the same reference characters. The detailed description of the labeled elements and components is not reproduced each time they occur.

The features and further properties that are depicted can be isolated from one another in any form, and combined in any way with one another, without departing from the essence of the invention.

An electric bicycle, constituting a preferred embodiment of vehicle 1 according to the present invention, will firstly be described in detail with reference to FIG. 1.

Vehicle 1, constituting an electric bicycle, encompasses a frame 12 on which a front wheel 9-1, a rear wheel 9-2, and a crank mechanism 2 having two cranks 7, 8 having pedals 7-1 and 8-1 are disposed. An electrical drive system 3 is integrated into crank mechanism 2. A sprocket 6 is disposed on rear wheel 9-2.

A drive torque that is furnished by the rider and/or by electrical drive system 3 is transferred from a chainring 4 on crank mechanism 2 via a chain to sprocket 6.

A control unit 10 that is connected to the optionally embodied electrical drive system 3 is furthermore disposed on the handlebars of vehicle 1. A battery 11, which serves to supply current to electrical drive system 3, is furthermore embodied in or on frame 12.

A crank bearing 13 or bottom bracket, which has a crank housing 14 and a crank spindle 15, is integrated into frame 12.

Drive assemblage 80 according to the present invention of vehicle 1 according to the present invention of FIG. 1 has crank mechanism 2 and electrical drive system 3, the torques generatable thereby being receivable via a corresponding transfer device 20 (not depicted in FIG. 1) having a shiftable planetary gearset 21, and transferrable to the chainring constituting output drive element 4.

Figure 2:
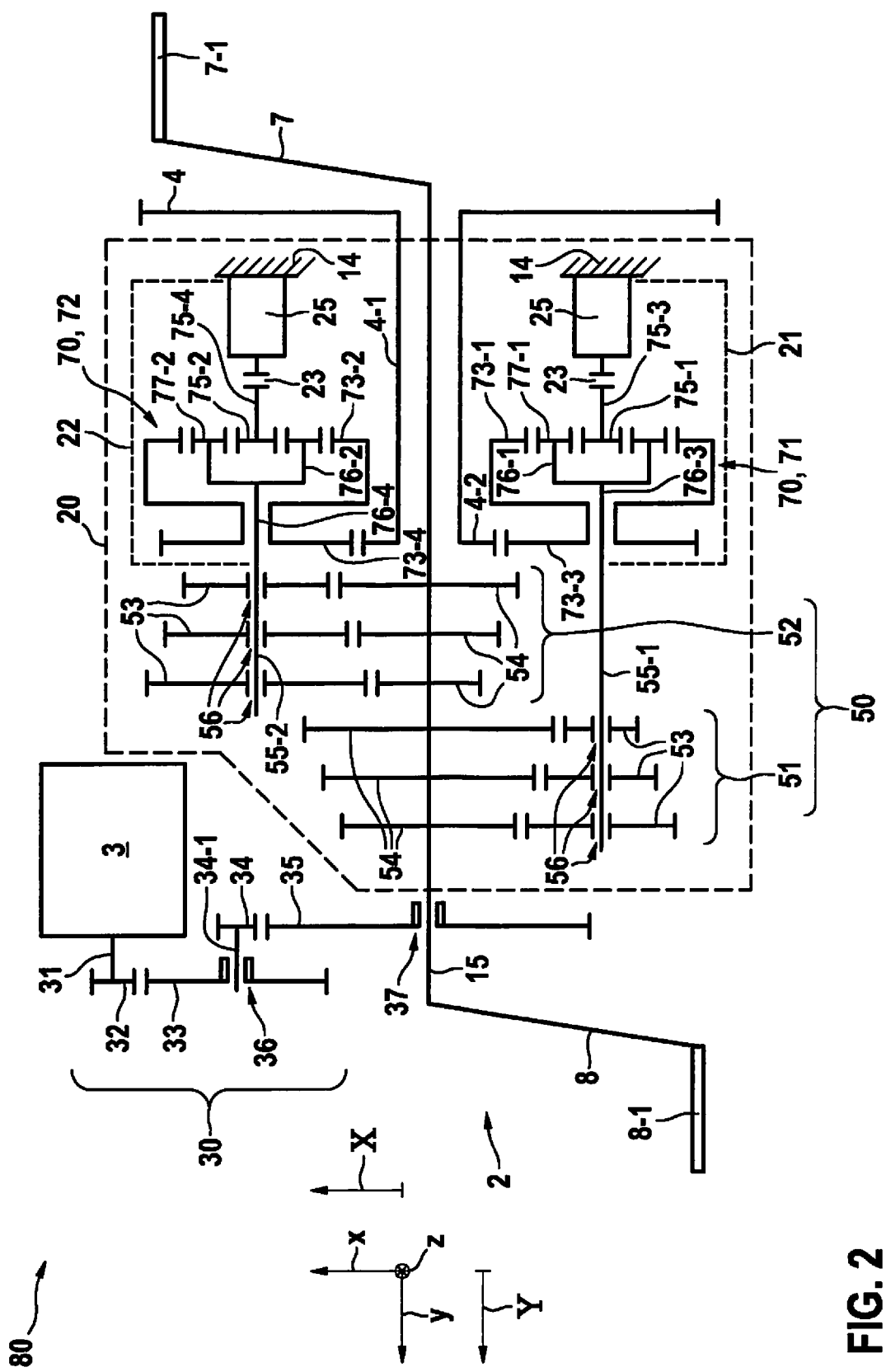
FIGS. 2 to 16 are schematic plan views of various embodiments of the drive assemblage according to the present invention having a crank mechanism and having an electrical drive system, having different configurations in terms of the coupling devices and their displacement units, the disposition of the individual shiftable spur gear transmissions, a motor reduction transmission that may be present, and a step-up stage that may be present.

FIG. 2 is a schematic plan view of an embodiment of drive assemblage 80 according to the present invention having an electrical drive system 3 and a crank mechanism 2.

A transfer device 20, which constitutes a shiftable transmission and has a spur gear transmission 50 having a first shiftable spur gear transmission 51 and having a second shiftable spur gear transmission 52 as sub-transmission structures, is embodied to transfer power and torques from crank mechanism 2 and/or from electrical drive system 3.

In the embodiment according to FIG. 2, a torque generated by muscle energy by a user via crank mechanism 2, and a torque generated via electrical drive system 3, can be generated and impressed onto crank mechanism 15.

In the embodiment according to FIG. 2, the torque generated by muscle energy is transferred directly via pedals 7-1 and 8-1 and cranks 7 and 8 to crank mechanism 15.

A motor reduction transmission 30 is embodied between electrical drive system 3, i.e. an electric motor. Said transmission constitutes a multi-stage spur gear transmission having spur gears 32, 33, 34, 35 disposed in that sequence from motor shaft 31 to crank mechanism 15, and in the embodiment of FIG. 2 has a first freewheel 36 between spur gear 33 and shaft 34-1 of spur gear 34, and a second freewheel 37 between spur gear 35 and crank mechanism 15.

Freewheels 36 and 37 can be embodied to be shiftable independently of one another.

These are the components of the input drive side of drive assemblage 80 of the embodiment in accordance with FIG. 2.

An output drive element 4, e.g. in the form of a chain ring or the like, is embodied on the output drive side in order to convey power and torque. In the embodiment in accordance with FIG. 2, this element sits on a hollow shaft 4-1 coaxially with crank spindle 15.

Hollow shaft 4-1 possesses on the end facing away from output drive element 4, i.e. on the input drive side, a spur gear 4-2 for meshing with a shiftable spur gear transmission 50, made up of first shiftable spur gear transmission 51 and second shiftable spur gear transmission 52, on its output drive side.

Shiftable spur gear transmissions 51 and 52 are each embodied in multiple stages and, in the embodiment according to FIG. 2, with three stages, specifically with corresponding first spur gears 53 that mesh with second spur gears 54. In shiftable spur gear transmissions 51 and 52, first spur gears 53 sit on a respective shaft 55-1, 55-2 on which they are individually shiftably couplable via shiftable connections 56. Second spur gears 54 of first and second shiftable spur gear transmissions 51, 52 are connected nonrotatably to crank spindle 15.

Shafts 55-1 and 55-2 respectively of first and of second shiftable spur gear transmission 51 and 52 are respectively adjoined by a shaft 76-3 and 76-4 of a first and a second coupling device 21 and 22, located downstream in the direction of the power and torque flow, of transfer device 20. Shaft 55-1, 76-3 on the one hand and 55-2, 76-4 on the other hand can respectively be embodied as one materially integral shaft.

In the embodiment in accordance with FIG. 2, first and second coupling devices 21 and 22 are each made up of a friction clutch 23 and an actuator 25 for actuating friction clutch 23.

With clutch 23 in the disengaged state, for instance when an actuator 25 is retracted, clutch 23 is inherently freely movable, e.g. rotatably around the respective axle 75-3 or 75-4.

With clutch 23 in the engaged state, for instance when actuator 25 is extended, the respective axle 75-3 or 75-4 is retained nonrotatably with reference to external housing 14.

A planetary coupling transmission 70, having a first planetary gearset 71 and a second planetary gearset 72, is located between clutch 23 and the respective shiftable spur gear transmission 51, 52. First planetary gearset 71 of planetary coupling transmission 70 is associated with first coupling device 21 and with first shiftable spur gear transmission 51; second planetary gearset 72 is associated with second coupling device 22 and with second shiftable spur gear transmission 52.

Planetary gearsets 71 and 72 are of substantially identical construction and respectively possess, on shafts 75-3 and 75-4 and connected nonrotatably thereto, a respective sun gear 75-1, 75-2, rotatable around axle 75-3, 75-4, respectively of first and of second planetary gearset 71, 72. Planet carriers 76-1, 76-2 having planets 77-1, 77-2 are disposed coaxially with axles 75-3, 75-2 and with the respective sun gear 75-1, 75-2. The above-described axles 76-3, 76-4, as continuations of axles 55-1 and 55-2 of first and second shiftable spur gear transmissions 51, 52, form the respective rotation axes of planet carriers 76-1, 76-2. Disposed outside planet carriers 76-1, 76-2 and planets 77-1, 77-2 is a respective ring gear 73-1, 73-2 having an internal tooth set, so that planets 77-1, 77-2 can mesh with the external tooth set of sun gears 75-1, 75-2 and with the internal tooth set of ring gears 73-1, 73-2.

Spur gear stages 73-3, 73-4, which are disposed to mesh with spur gear stage 4-2 of shaft 4-1 of output drive element 4, are embodied as continuations of ring gears 73-1, 73-2 and are nonrotatably connected thereto.

As a result of these features, the power and torque flow from crank mechanism 2 and from electrical drive 3, proceeding from the input side to the output side at output drive element 4, is controllable with a variable conversion ratio.

Figure 3:
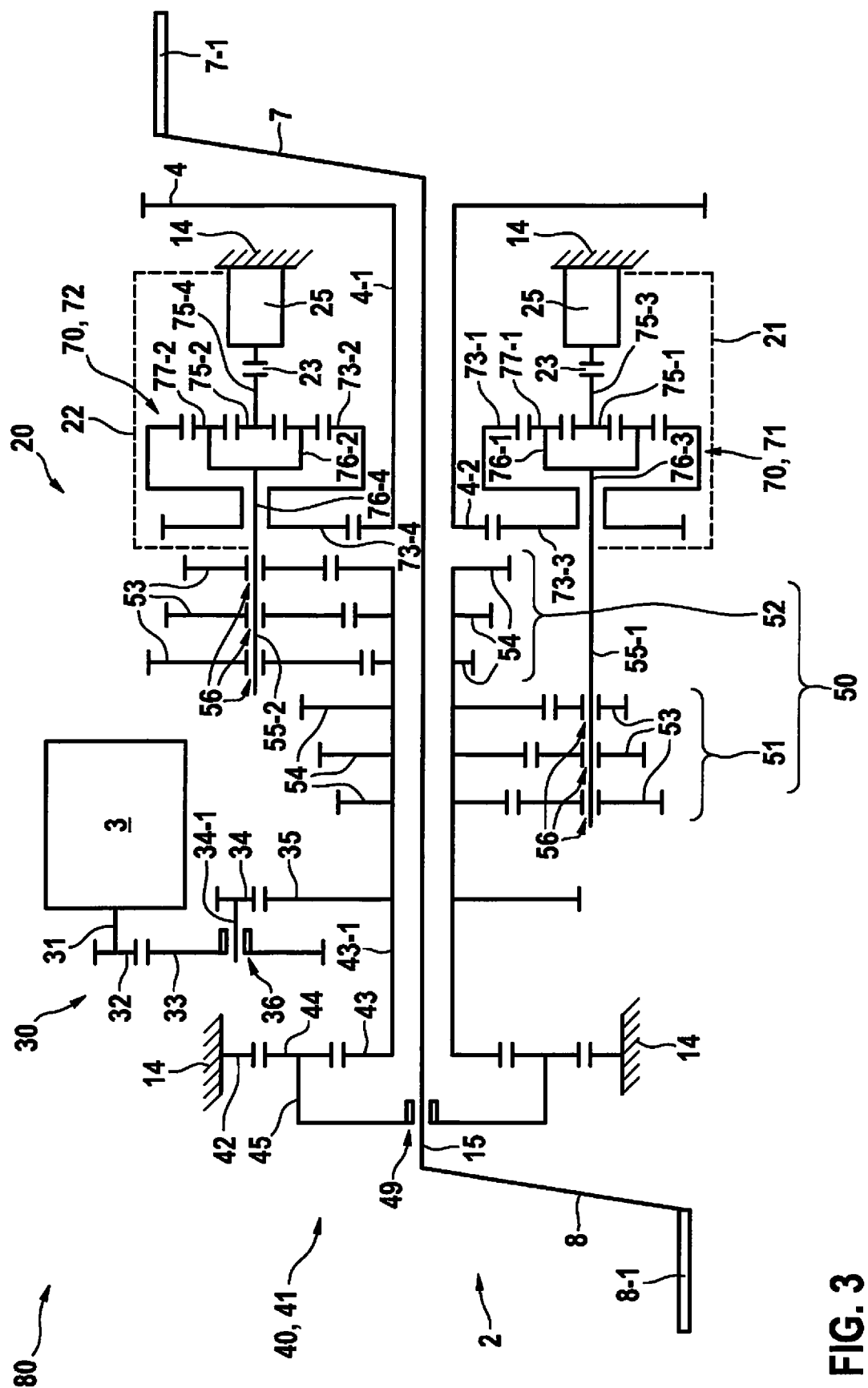

FIG. 3 shows another embodiment of drive assemblage 80 according to the present invention, although essential aspects of first and second coupling devices 21 and 22 of transfer device 20, and the configuration of first and second shiftable spur gear transmissions 51 and 52 and of motor reduction transmission 30, correspond substantially to those of FIG. 2.

In the embodiment in accordance with FIG. 3, however, spur gear 35 of motor reduction transmission 30 and second spur gears 54 of first and second shiftable spur gear transmissions 51 and 52 engage not directly onto crank spindle 15 but instead onto a hollow shaft 43-1, disposed coaxially with crank spindle 15 and with shaft 4-1 of output drive element 4, of a step-up stage 40 that is disposed on the input side with reference to the power and torque flow, has planetary gearset 41, and is coaxially connected to its sun gear 43. Step-up stage 40 serves to reduce the large input torque of the rider; it has, in conjunction with planetary gearset 41: a planet carrier 45 having a freewheel 49 shiftable with respect to crank spindle 15 and having planets 44; the centrally internally located sun gear 43; and a coaxially externally located ring gear 42 having an internal tooth set and a nonrotatable connection to housing 14.

The disposition of planetary gearset 41 of step-up stage 40 is selected so that planets 44 rotate on planet carrier 45 and so that the external tooth set of sun gear 43 and the internal tooth set of ring gear 42 can mesh.

The output-side spur gear 35 of motor reduction transmission 30 is connected to hollow shaft 43-1 in order to transfer the torques generated by muscle energy via crank mechanism 2, and by electrical drive system 3 by way of the motor, from the input side to output drive element 4 located on the output drive side. At the same time, hollow shaft 43-1 constitutes a coaxial continuation of sun gear 43, so that the torque generated by muscle energy is thereby also conveyable from crank mechanism 2 to the output side.

In the embodiments in accordance with FIGS. 2 and 3, first and second spur gears 53 and 54 of first and second shiftable spur gear transmissions 51 and 52 are located in terms of the power and torque flow essentially on the input side, namely either directly on crankshaft 15 or on hollow shaft 43-1 of sun gear 43 of step-up stage 40.

Figure 4:
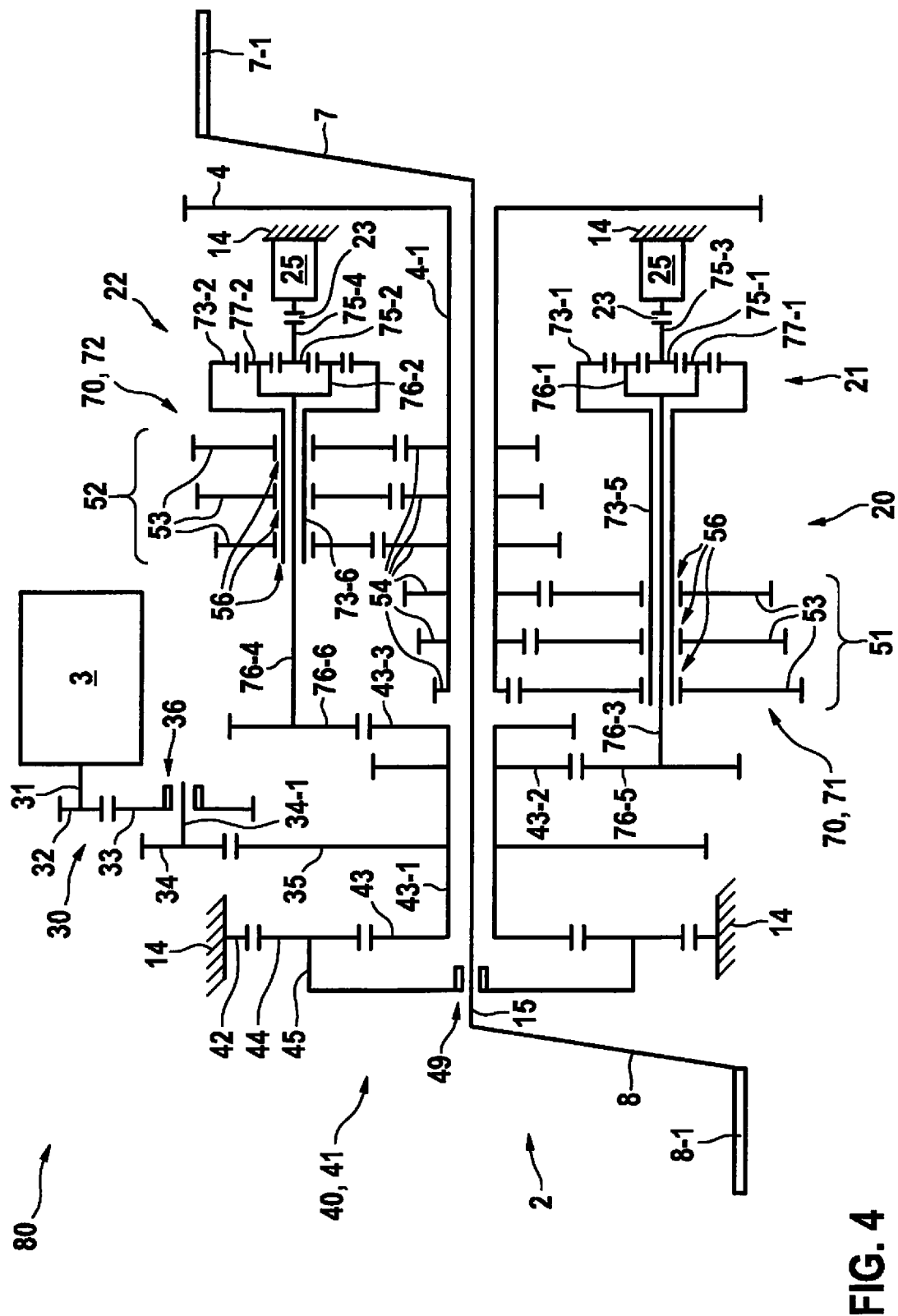

The embodiment in accordance with FIG. 4 of drive assemblage 80 according to the present invention corresponds in terms of its essence and in substantial aspects, namely with regard to coupling devices 21, 22 of motor reduction transmission 30 and step-up stage 40, to the embodiment according to FIG. 3.

In contrast thereto, however, in the embodiment in accordance with FIG. 4, first and second spur gears 53 and 54 of first and second shiftable spur gear transmissions 51 and 52 are disposed on the output drive side of transfer device 20, i.e. facing output drive element 4, and in particular are mounted on hollow shaft 4-1 that is now prolonged to output drive element 4.

A difference furthermore exists with regard to the coupling of the separately provided first and second planetary gearsets 71 and 72 of planetary coupling transmission 70.

In the embodiments in accordance with FIGS. 2 and 3, shafts 76-3, 76-4 of planet carriers 76-1, 76-2, constituting extensions of shafts 55-1, 55-2 of shiftable spur gear transmissions 51, 52, are connected via shiftable connections 56 on the input side or input drive side to first spur gears 53 of first and second shiftable spur gear transmissions 51, 52. Ring gears 73-1, 73-2 of planetary gearsets 71, 72, on the other hand, are coupled on the output side or output drive side, via nonrotatably coupled spur gear stages 73-3, 73-4, to output drive element 4.

In the embodiment in accordance with FIG. 4, however, the relationships are different.

Here shafts 76-3, 76-4 of planet carriers 76-1, 76-2 are coupled on the input drive side or input side to spur gears 76-5, 76-6 on shafts 76-3, 76-4 or to spur gears 43-2, 43-3 of hollow shaft 43-1 of sun gear 43 of step-up stage 40. In the embodiment according to FIG. 4, ring gears 73-1, 73-2 of first and second planetary gearsets 71, 72 of planetary coupling transmission 70 are not continued as a spur gear stage but instead extend out into hollow shafts 73-5, 73-6, which are coaxial with shafts 76-3, 76-4 of planet carriers 76-1, 76-2 and onto which first spur gears 53 of shiftable spur gear transmissions 51, 52 are controllably couplable via shiftable connections 56.

First spur gears 53 of shiftable spur gear transmissions 51, 52 mesh with second spur gears 54 of shiftable spur gear transmissions 51, 52 which are mounted on hollow shaft 4-1 associated with output drive element 4.

Figure 5:
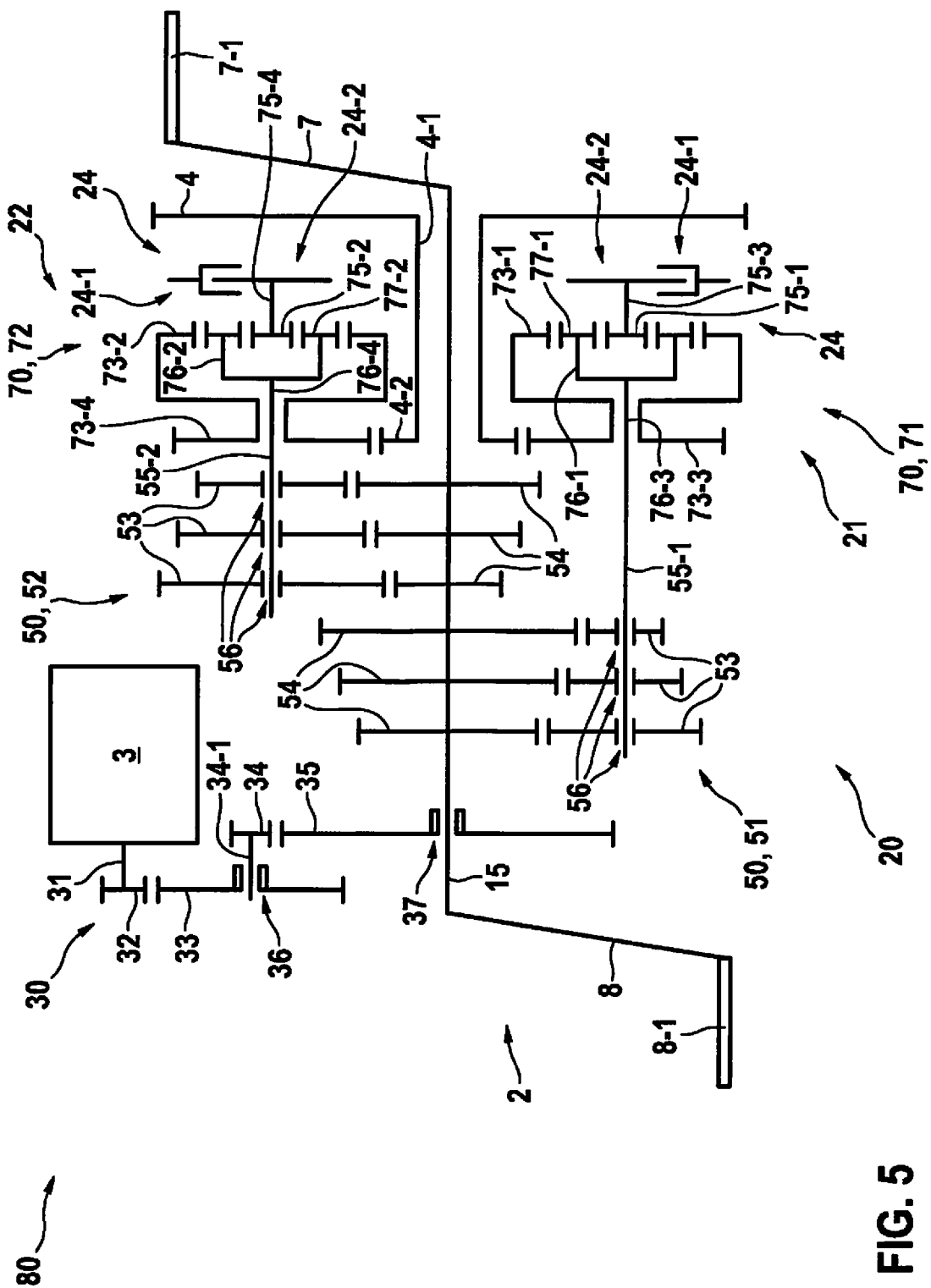

In the embodiment in accordance with FIG. 5 of drive assemblage 80 according to the present invention, in contrast to the embodiment in accordance with FIG. 2 a brake 24 having a brake shoe 24-1 and a brake disk 24-2 is present instead of a clutch 23 having an actuator 25.

Figure 6:
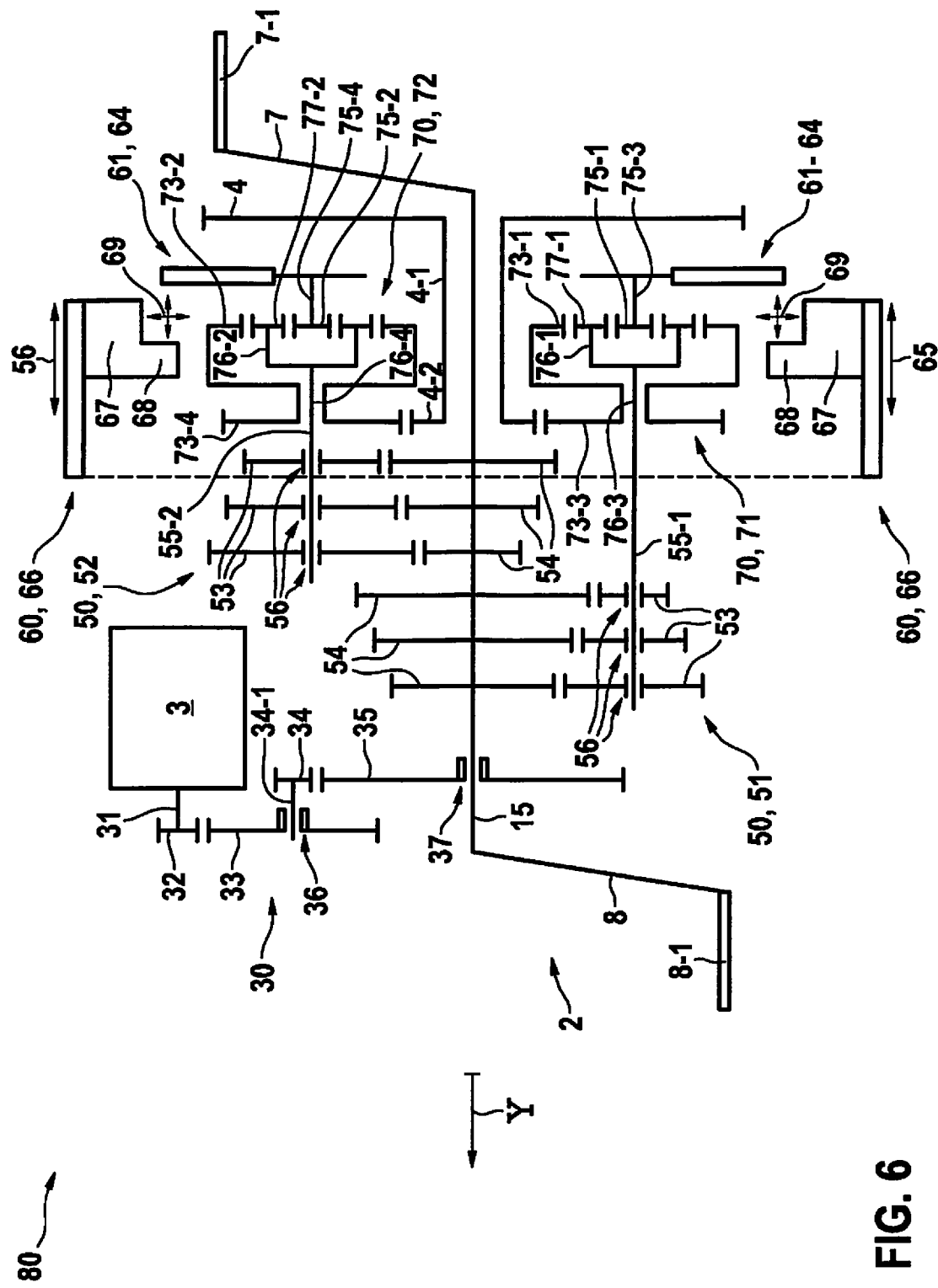

In the embodiment in accordance with FIG. 6, in contrast to the embodiment in accordance with FIG. 2, in the context of drive assemblage 80 according to the present invention, in conjunction with first and second planetary gearsets 71 and 72 of coupling transmission 70 a respective is embodied nonrotatably with sun gears 75-1, 75-2 having entrainer element 64 in the form of a shifting finger 61 in order to immobilize and release sun gears 75-1, 75-2.

By displacement of positioning drive 60, having shift gate 66, in displacement direction 65 coaxially with extent direction Y of crank spindle 15 on whose gate body 67 a stop element 68 and a gap 69 are embodied, the rotation of the respective sun gear 75-1, 75-2 can be blocked as entrainer element 64 of shifting finger 61 comes to a stop against stop element 68 of gate body 67. Conversely, when a gap 69 exists in the movement path of shifting finger 61, free rotation of shifting finger 61, and thus of sun gear 75-1, 75-2 connected to shifting finger 61, is possible.

Figure 7:
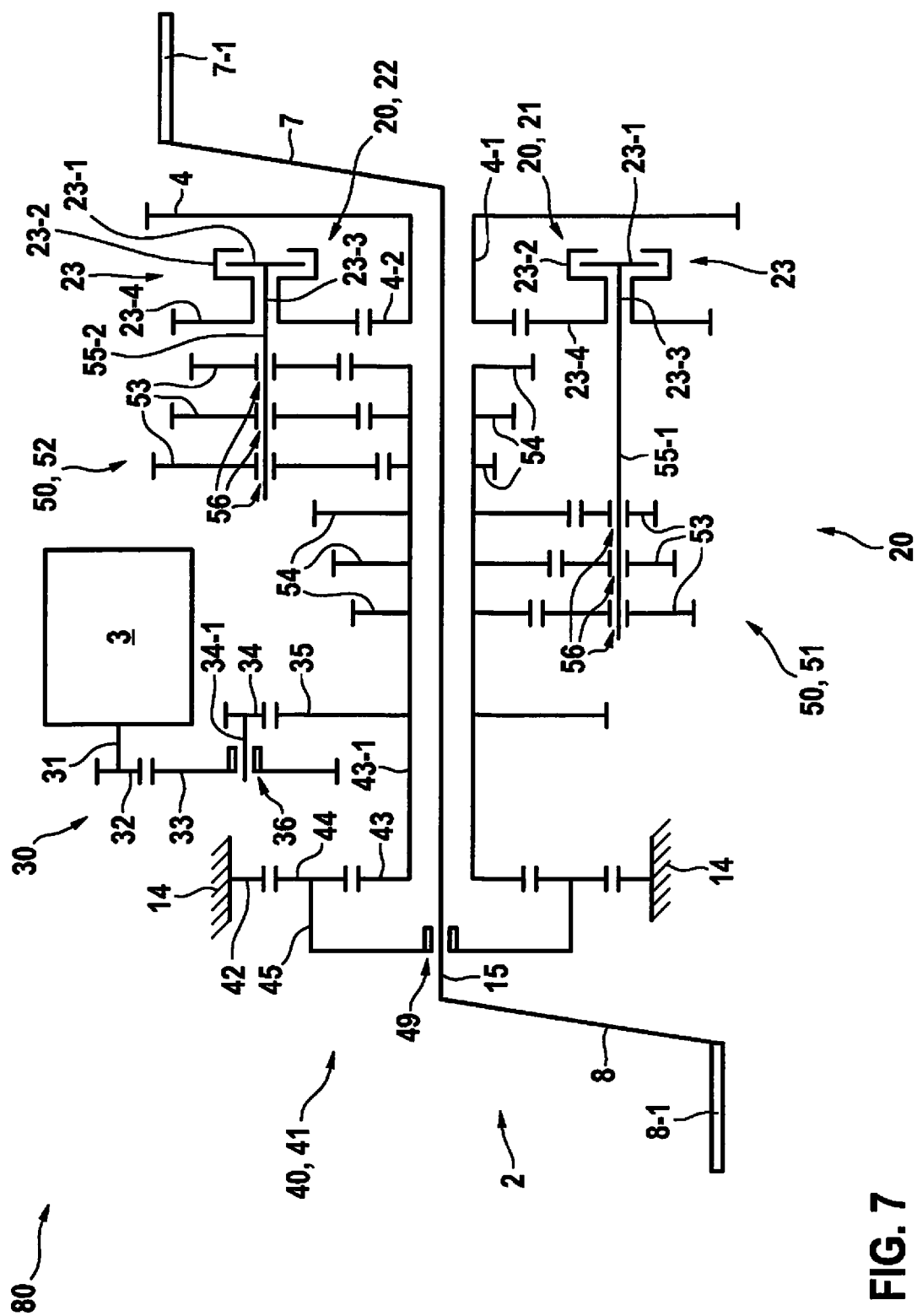

The embodiment in accordance with FIG. 7 of drive assemblage 80 corresponds substantially to the embodiment of FIG. 3. In contrast thereto, in the embodiment in accordance with FIG. 7 the assemblage made up of planetary coupling transmission 70 along with first and second planetary gearsets 71 and 72 is replaced simply by a friction clutch 23.

Each of friction clutches 23 is constituted by a first friction element 23-1, for instance in the form of a rotary plate, and a second friction element 23-2, for instance cup-shaped and receiving the respective first friction element 23-1 in it, which can be coupled to one another by friction or decoupled from one another.

First friction element 23-1 extends into an intermediate shaft 23-3 which is adjoined in nonrotatably connected fashion by the respective shaft 55-1, 55-2 of the respective shiftable spur gear transmission 51, 52, and onto which first spur gears 54 of first and second shiftable spur gear transmissions 51 and 52 are therefore couplable via shiftable connections 56.

Second friction element 23-2, for instance in the form of a cup or housing, extends into a spur gear stage 23-4 having an external tooth set that meshes with spur gear stage 4-2 of hollow shaft 4-1 associated with output drive element 4.

With first and second friction elements 23-1, 23-2 in the decoupled state, they are freely rotatable around intermediate shaft 23-3 with no interaction with respect to one another, so that no transfer of power or torque occurs.

When first and second friction elements 23-1, 23-2 are engaged, they are nonrotatably connected to one another; and when one of shiftable connections 56 is active, a common rotation occurs around intermediate shaft 23-2 with power and torque transfer toward output drive element 4.

In the embodiments in accordance with FIGS. 2 to 6 of the drive assemblage according to the present invention, planetary coupling transmission 70 was embodied with individual planetary gearsets 71 and 72 that are separated from one another and have correspondingly separated coupling devices 21 and 22.

In the embodiments in accordance with FIGS. 8 to 15 of the drive assemblage according to the present invention, conversely, planetary coupling transmission 70 is embodied in integrated fashion with individual planetary gearsets 71' and 72' that are oriented coaxially with one another. Motor reduction transmission 30 that is provided engages respectively via the common planet carrier 76 in nonrotatable connection with crank spindle 15, specifically for the embodiments in accordance with FIGS. 8 to 13, or via coupling via a step-up stage 40, and in the embodiments of FIGS. 14 and 15 via the downstream first and second shiftable spur gear transmissions 51 and 52 to output drive element 4.

In the embodiments of FIGS. 8 to 15, a spur gear 76-7 that meshes controllably with motor-reduced transmission 30 of electrical drive system 3 is embodied on common planet carrier 76.

In the embodiments in accordance with FIGS. 4 to 16, in the context of the drive assemblage according to the present invention the respective coupling devices 21 and 22 are embodied on the input side, specifically with reference to the power and torque flow. In essence the concepts already presented, having a shifting finger 61 and gate 66 according to FIG. 6, having brakes 24 according to FIG. 9, and via separate friction clutches 23 according to FIGS. 10 to 14, are provided as coupling devices 21 and 22.

In the embodiments of FIGS. 8 to 15, ring gears 73-1 and 73-2 of sub-transmissions 71', 72' of the integrated planetary coupling transmission 70 possess hollow shafts 73-5, 73-6 which are nested inside one another and are coaxial with one another and with crank spindle 15, and on which second spur gears 54 of first and second shiftable spur gear transmissions 51 and 52 are respectively nonrotatably mounted. Second spur gears 54 mesh with first spur gears 53 of first and second shiftable spur gear transmissions 51, 52, the latter controllably, via shiftable connections 56, with shafts that continue into spur gears and in turn mesh with spur gear 4-2 of hollow shaft 4-1 of output drive element 4 in order to produce the power and torque flow toward output drive element 4.

The invention relates to electric vehicles (pedelecs/e-bikes) having a center motor and a bicycle transmission in order to adapt the rider's limited input drive energy to different riding resistances.

In electric vehicles having a bottom-bracket drive system, it is known to dispose a derailleur gear system or hub gear system on the rear wheel and an electrical drive system on the bottom bracket.

Also known are bottom-bracket drive systems having an integrated shiftable transmission, which have a hollow-shaft motor coaxial with the bottom-bracket crank spindle and a shiftable transmission axially parallel with the bottom-bracket crank spindle.

Friction ring transmissions that constitute steplessly adjustable shiftable bicycle transmissions can also be integrated into a pedelec/e-bike bottom-bracket drive system. A friction ring transmission, constituting a frictionally engaged transmission, has the disadvantage of comparatively low efficiency, which affects battery range and ridability without motor assistance, especially riding at more than 25 km/h for pedelecs.

Bottom-bracket drive systems having integrated transmissions based on spur gear transmissions are not shiftable under load, or even under a light partial load, when shifting down into a lower gear. These transmissions furthermore do not have electromechanically actuated automatic gear selection. They moreover have the serious disadvantage that shifting cannot occur without an interruption in tractive energy. The rider experiences a clearly perceptible dead zone in the pedal cranks when shifting, especially if he or she is applying an accelerating force to the pedals.

One of the further objects on which the invention is based is that of integrating, into a drive unit at the bottom bracket of a pedelec, an automatic bicycle transmission that is efficient, shiftable under load, and experiences no interruption in tractive energy. A shifting apparatus at the rear wheel can be omitted. A compact implementation of the pedelec drive system is to be achieved.

The invention achieves the stated object with the use and integration of a shiftable spur gear transmission 50 in the form of two shiftable spur gear transmissions 51, 52 constituting sub-transmissions, which can be controllably coupled into the power and torque flow via two coupling devices 21, 22 so as thereby to enable fully automatic gear shifting with no interruption in tractive energy. Shiftable spur gear transmission 50 takes on the task of shifting the bicycle or varying the conversion ratio for the input drive energy from the rider. Thanks to the use of a positively engaging transmission, efficiency can be improved as compared with an integrated frictionally engaged transmission.

The two sub-transmissions 51, 52 possess one common transmission output and can be alternatingly taken into the power flow, for example via friction clutches 23.

Shifting, or varying of the conversion ratio, can be accomplished firstly, before the actual gear change, by engaging the gear that is to be shifted or by selecting a conversion ratio in the respective zero-load sub-transmission 51, 52. With a change in the power flow or torque transfer from the previously loaded ratio or sub-transmission 51, 52 to the preselected ratio or the zero-load sub-transmission 52, 51, the shifting operation with a conversion ratio change is completed.

Torque transfer between the two sub-transmissions 51, 52 with no interruption in tractive energy is possible by way of two friction clutches 23. During the shifting operation, clutch 23 of the zero-load sub-transmission 51, 52 having the preselected gear ratio is closed, and clutch 23 of the previously loaded sub-transmission 52, 51 is simultaneously opened.

According to the present invention, brakes 24, shiftable freewheels, solenoids, electric motors/positioning drives, or a shift gate with which the gear shafts of the sub-transmission can be immobilized, can be also used alongside friction clutches 23 to implement the transfer of torque between the two sub-transmissions 51, 52 with no interruption in tractive energy.

In addition, according to the present invention a preferred linkage of the shifting actuator system for torque transfer occurs via a planetary coupling transmission 70, either in integrated form having transmission stages or sub-transmissions 71', 72' or via separate individual planetary gearsets 71, 72.

Torque transfer then takes place by simply immobilizing and then releasing sun gears 75-1, 75-2 with respect to housing 14. The result is that the shifting actuator system for torque transfer does not co-rotate but instead is connected nonrotatably to housing 14.

A motor 3 can selectably be linked to shiftable transmission 50 via a reduction transmission 30, preferably at the input of shiftable transmission 50.

FIGS. 1 to 16 show preferred embodiments and variants for constructing a drive assemblage 80 according to the present invention, for instance of a pedelec/e-bike bottom-bracket drive system having an integrated spur gear transmission 50 shiftable with no interruption in tractive energy.

In all the embodiments, shiftable spur gear transmission 50 is made up of two sub-transmissions 51, 52 that can be alternatingly shifted into the power flow by way of a shifting actuator system.

Friction clutches 23, electric motors, positioning drives 60 (see FIGS. 2 to 4, 7, and 10 to 16), brakes (FIGS. 5 and 9), or a shift gate (FIGS. 6 and 8) with which the corresponding gear shafts can be immobilized, can be used for the shifting actuator system.

Alternatively, for example, shiftable freewheels or solenoids can also be used.

In the embodiments of FIGS. 2 to 6 and 8 to 15, the shifting actuator system is linked preferably via a planetary coupling transmission 70. The result is that the shifting actuator system does not co-rotate, and a sub-transmission 51, 52 can easily be switched in by retaining sun gear 75-1, 75-2 nonrotatably on housing 14.

According to the present invention, a shifting operation can be effected in two steps:

(1) Preselecting a conversion ratio in the zero-load sub-transmission, for example by way of a shifting rod having a linear cam or pawls. Torque can be transferred from the gear to the shaft at the point at which the linear cam or pawl positively nonrotatably connects the gear to the shaft.

(2) Torque transfer with no interruption in tractive energy, for example by way of two friction clutches 23 (FIGS. 2 to 4, 7, 9 to 16), from the hitherto loaded sub-transmission 51, 52 to the zero-load sub-transmission 52, 51 having the preselected conversion ratio. For this, clutch 23 of the zero-load sub-transmission 51, 52 having the preselected gear ratio is closed, and clutch 23 of the hitherto loaded sub-transmission 52, 51 is simultaneously opened.

In accordance with FIGS. 3, 5, 7, 14, 15, shiftable spur gear transmission 50 can be preceded by a planetary stage 41, constituting a step-up stage 40, in order to reduce the rider's high input torque. This makes possible a particularly compact arrangement of both motor reduction transmission 30 and shiftable spur gear transmission 50.

Two freewheels 36, 37, visible for example in FIG. 3, on the one hand provide the capability for back-pedaling, and on the other hand serve to decouple motor 3 upon failure thereof or to shut off the motor at a travel speed over 25 km/h.

Figure 11:
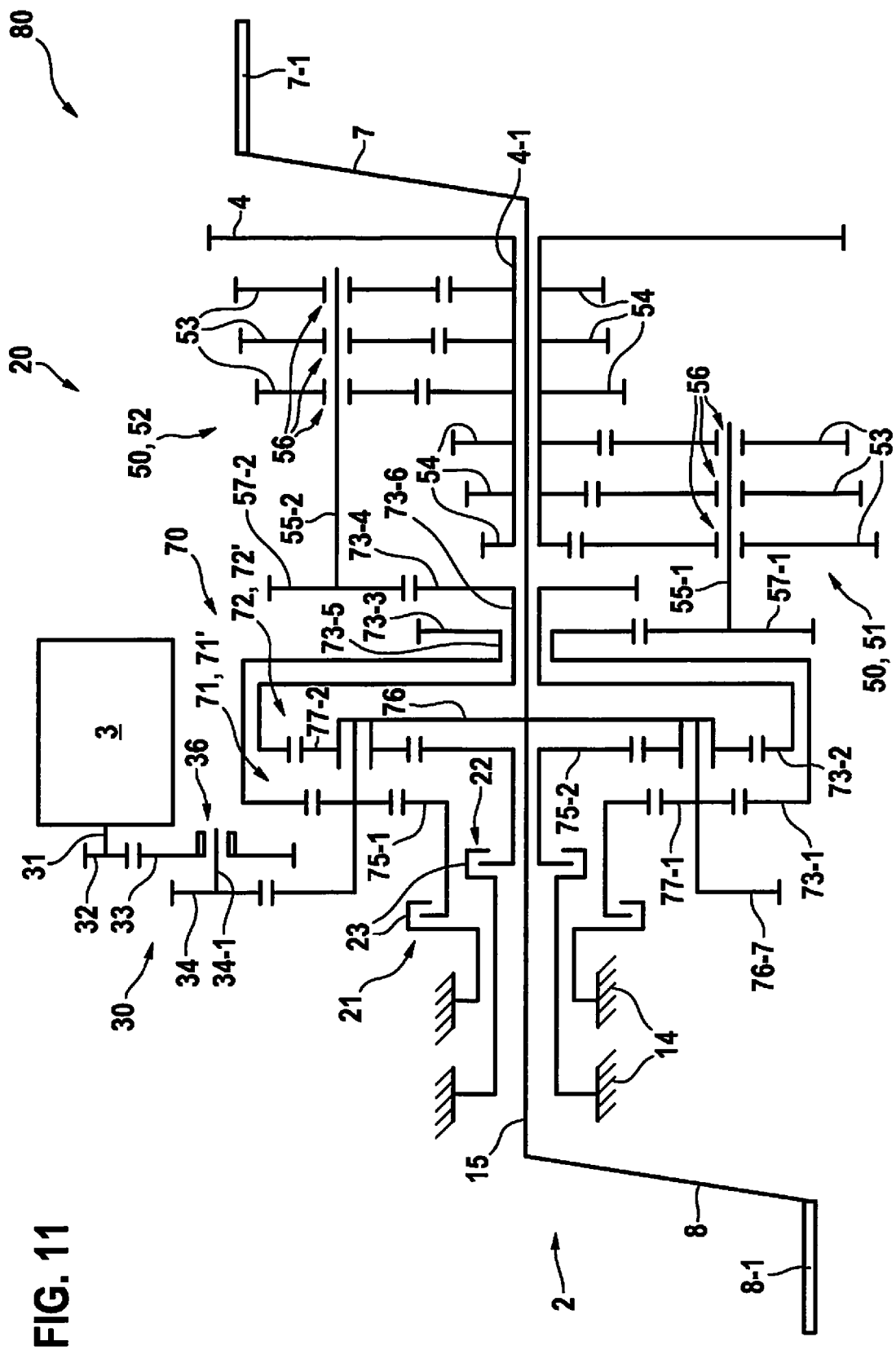

FIGS. 4 and 11 show a variant in which the transmission stages of shiftable spur gear transmission 50 are disposed at the transmission output.

FIGS. 2, 3, 5 to 10, and 13 to 14, conversely, show placement of the transmission stages at the transmission input.

Figure 12:
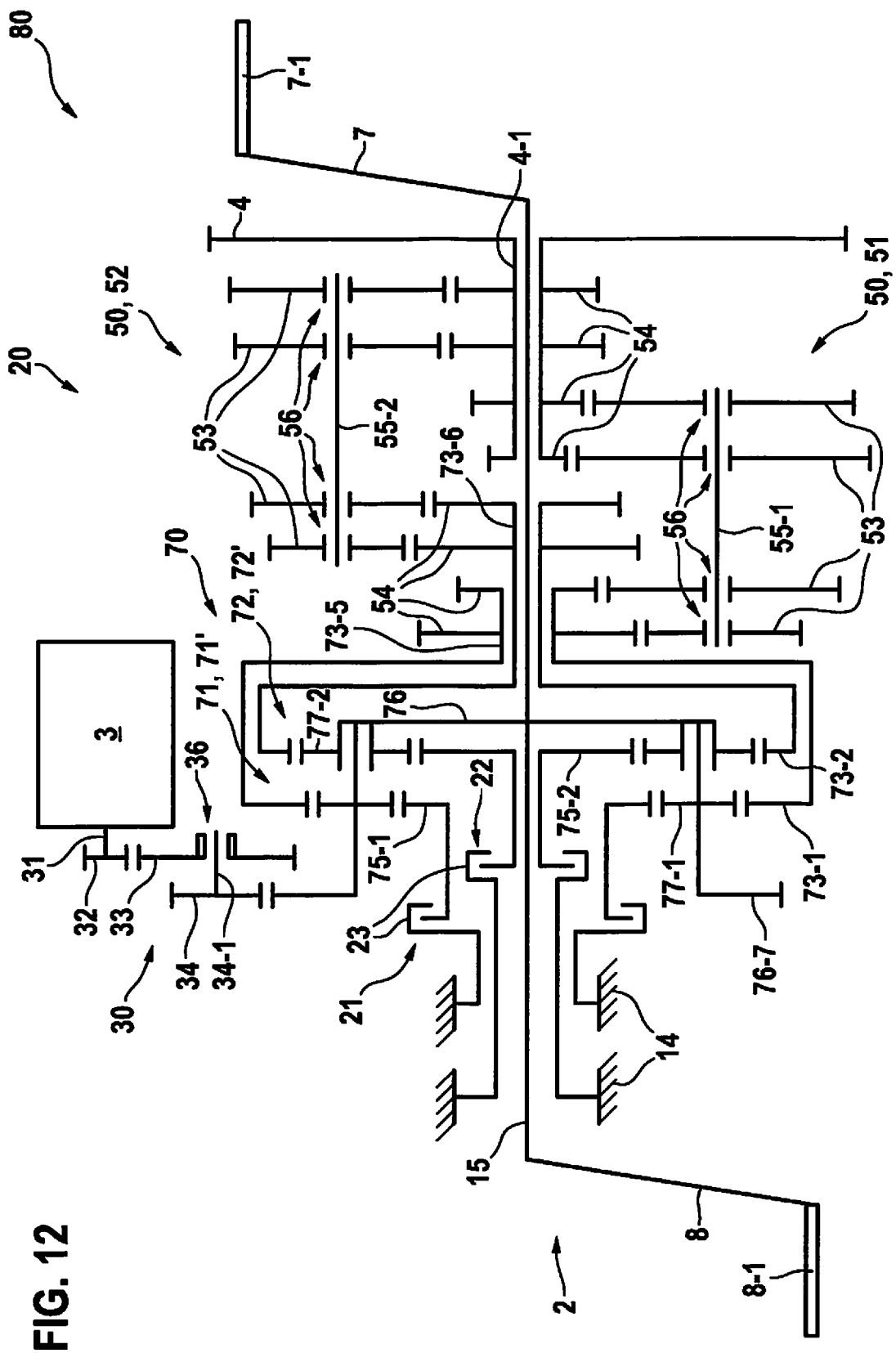

In FIG. 12, transmission stages are disposed in distributed fashion both at the transmission output and at the transmission input.

Figure 8:
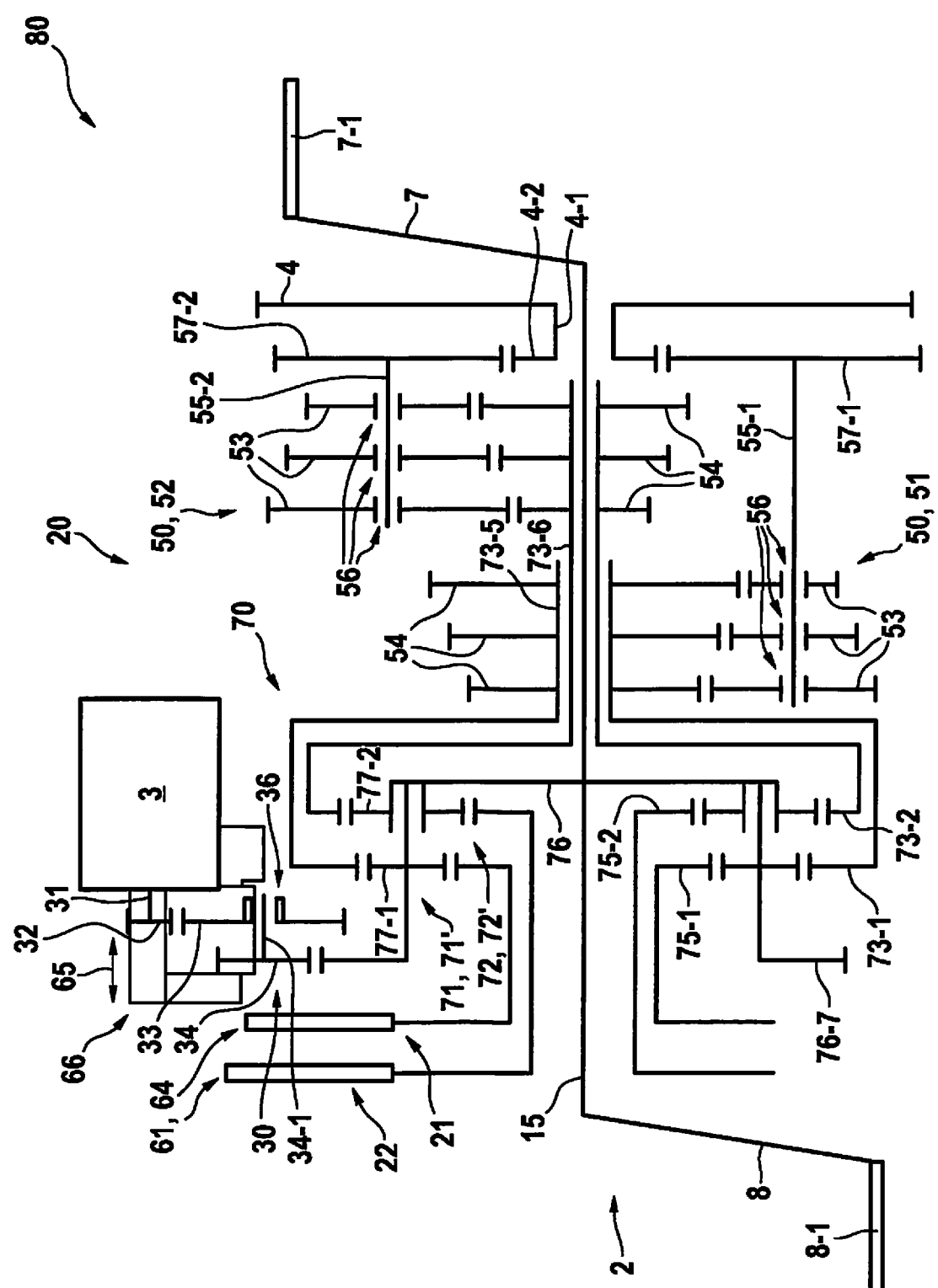

FIGS. 6 and 8 show embodiments of drive assemblage 80 having a shifting actuator system constituting a positioning drive 60 having shifting fingers 61 and a shifting gate 66. Shifting fingers 61 are nonrotatably connected to sun gears 75-1, 75-2 of planetary coupling transmission 70 and can be immobilized by way of a shifting gate 66 that can be moved parallel to bottom-bracket crank spindle 15 in direction 65.

Figure 9:
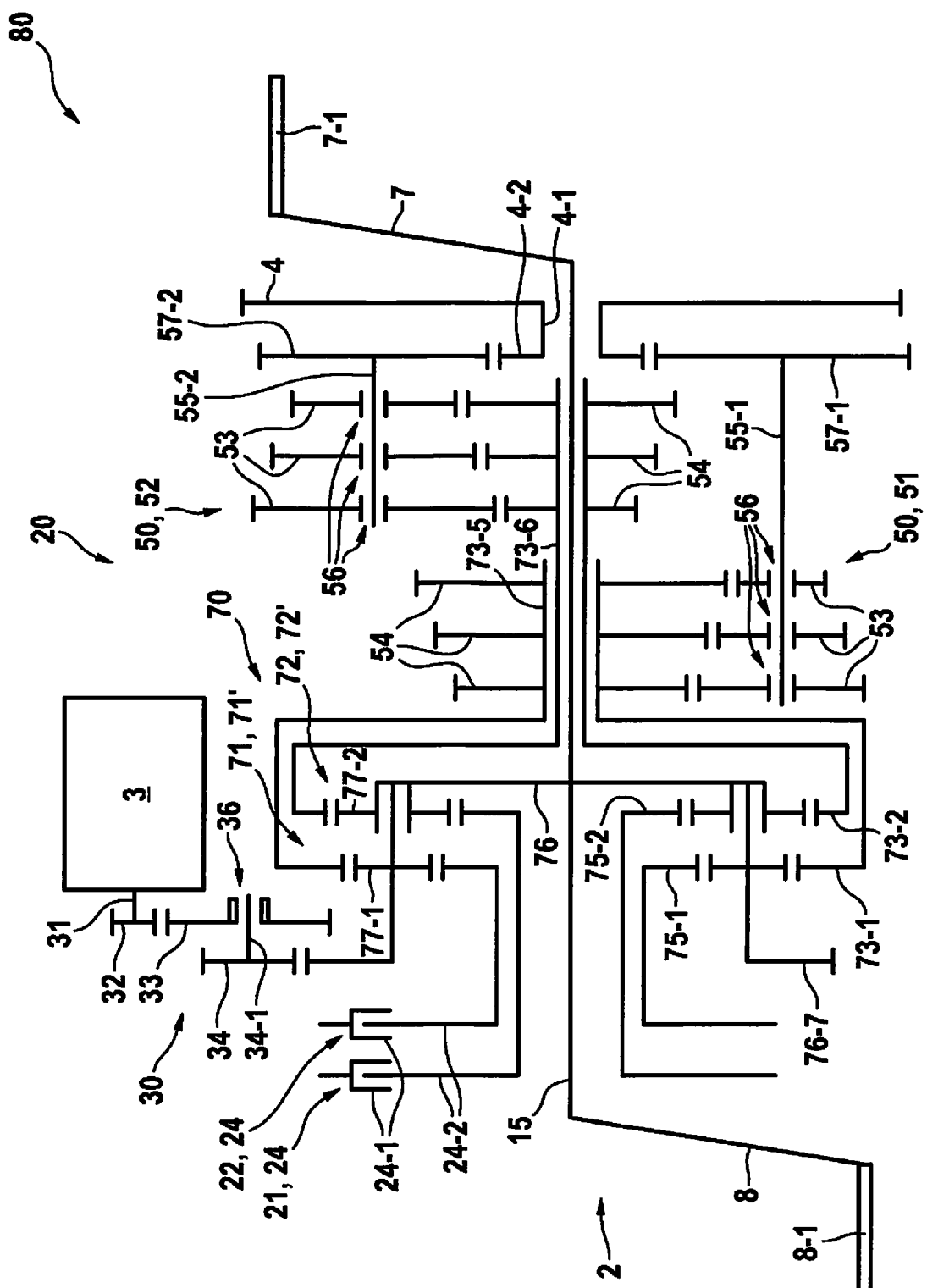

In FIGS. 5 and 9, a shifting actuator system for torque transfer is implemented using brakes 24. Brakes 24 are preferably disc brakes and can be actuated, for example, using hydraulics. Discs 24-2 are connected nonrotatably to sun gears 75-1, 75-2 and co-rotate with sun gears 75-1, 75-2.

Similarly to the case with friction clutches 23, with the two brakes 24 the rotation speeds of sun gears 75-1, 75-2 can be continuously and steplessly monitored in electronic coordination with one another so as thereby to transfer torque from one sub-transmission 51, 52 to the other with no interruption in tractive energy.

Figure 16:
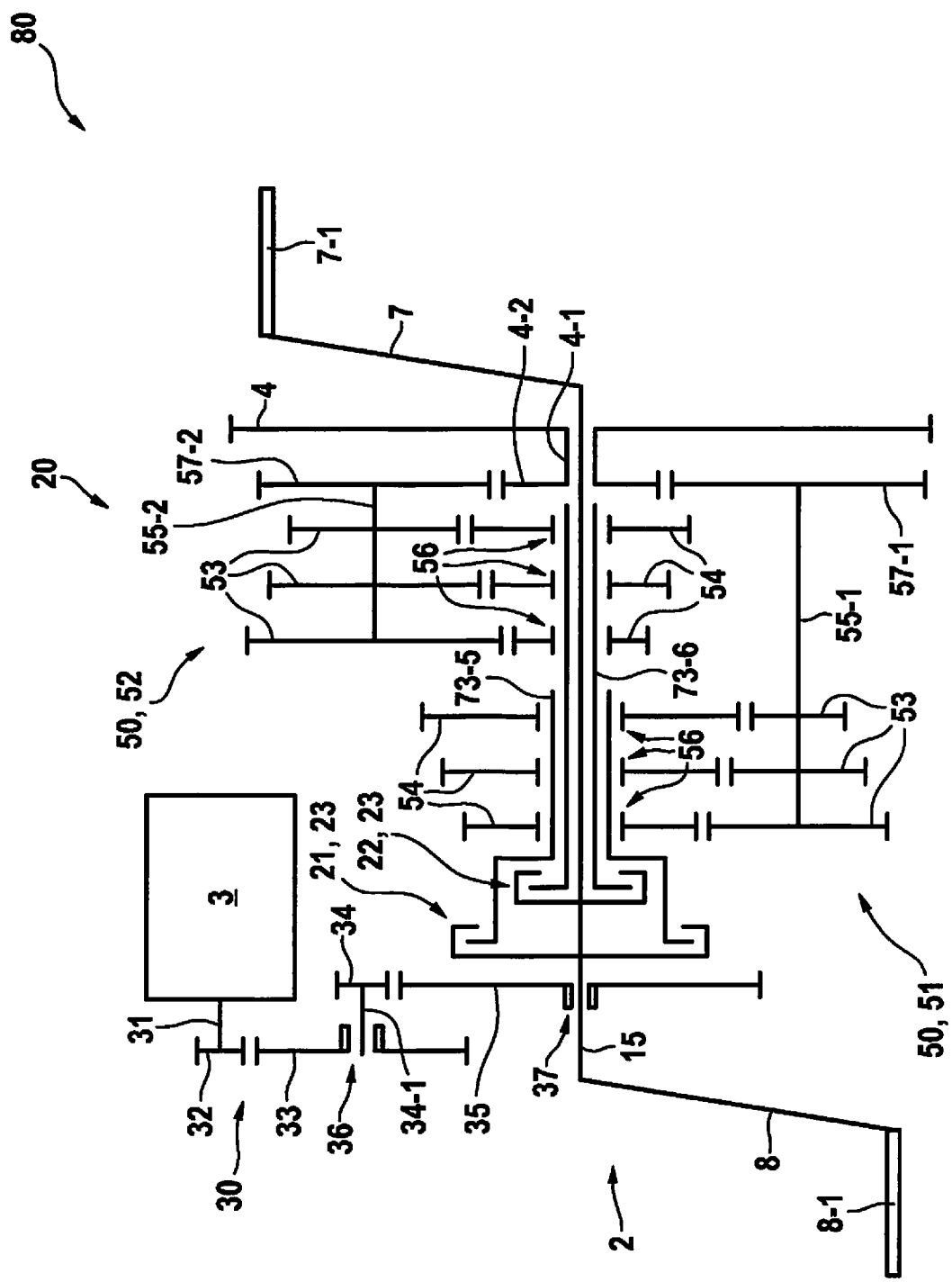

FIGS. 7 and 16 show alternative embodiments of the shifting actuator system with no linkage via a planetary gearset.

In FIGS. 2 to 7, the shifting actuator system for torque transfer is mounted on intermediate shafts 55-1, 55-2 of sub-transmissions 51, 52.

FIGS. 8 to 16 show, at the input of the two sub-transmissions 51, 52 of shifting transmission 50, a coaxial disposition of planetary stages 71', 72' of planetary coupling transmission 70 as well as friction clutches 23, electric motors 3, and positioning drive 60 for bottom-bracket crank spindle 15. In the embodiments of FIGS. 8 to 11 and 13 to 16, intermediate shafts 55-1, 55-2 of sub-transmissions 51, 52 for first spur gears 53 each have a spur gear stage 75-1, 75-2 for meshing with spur gear 4-2 of hollow shaft 4-1 of output drive element 4.

Figure 15:
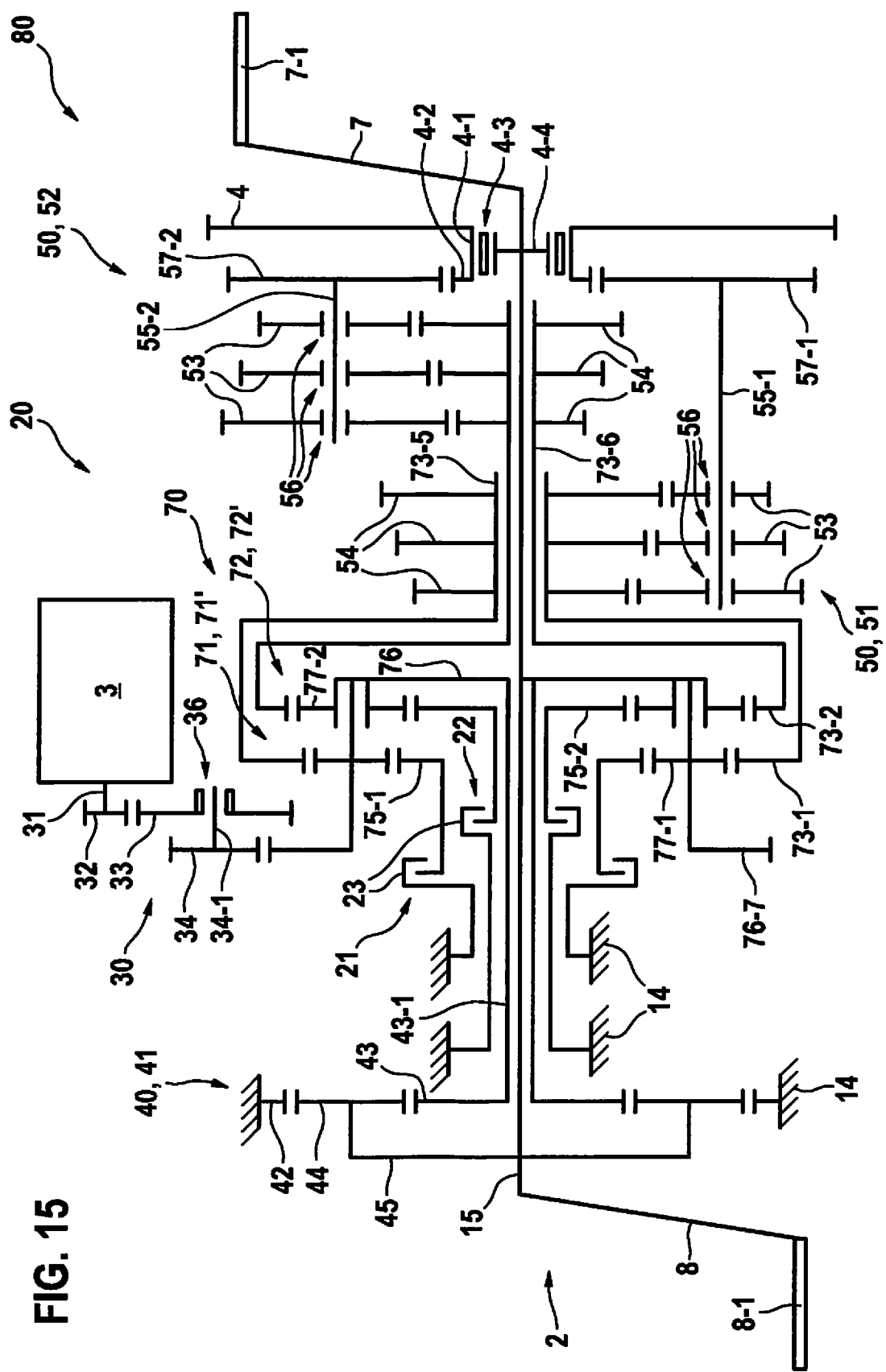

By way of a further freewheel 4-3, bottom-bracket crank spindle 15 can be connected directly to the transmission output of shiftable transmission 50 and thus directly to chainring 4 (FIG. 15). This direct connection of bottom-bracket crank spindle 15 to chainring 4 occurs when both sub-transmissions 51, 52 are not under load, for example because the two friction clutches 23 are open. A further gear having a conversion ratio of one can thereby be realized in simple and compact fashion. The conversion ratio having a ratio of 1:1 means here a direct gear ratio 4-4 with correspondingly high efficiency. The conversion ratio implemented by way of freewheel 4-3 does not need to be actively engaged, but instead is mechanically self-shiftingly implemented by the overrunning clutch.

Figure 13:
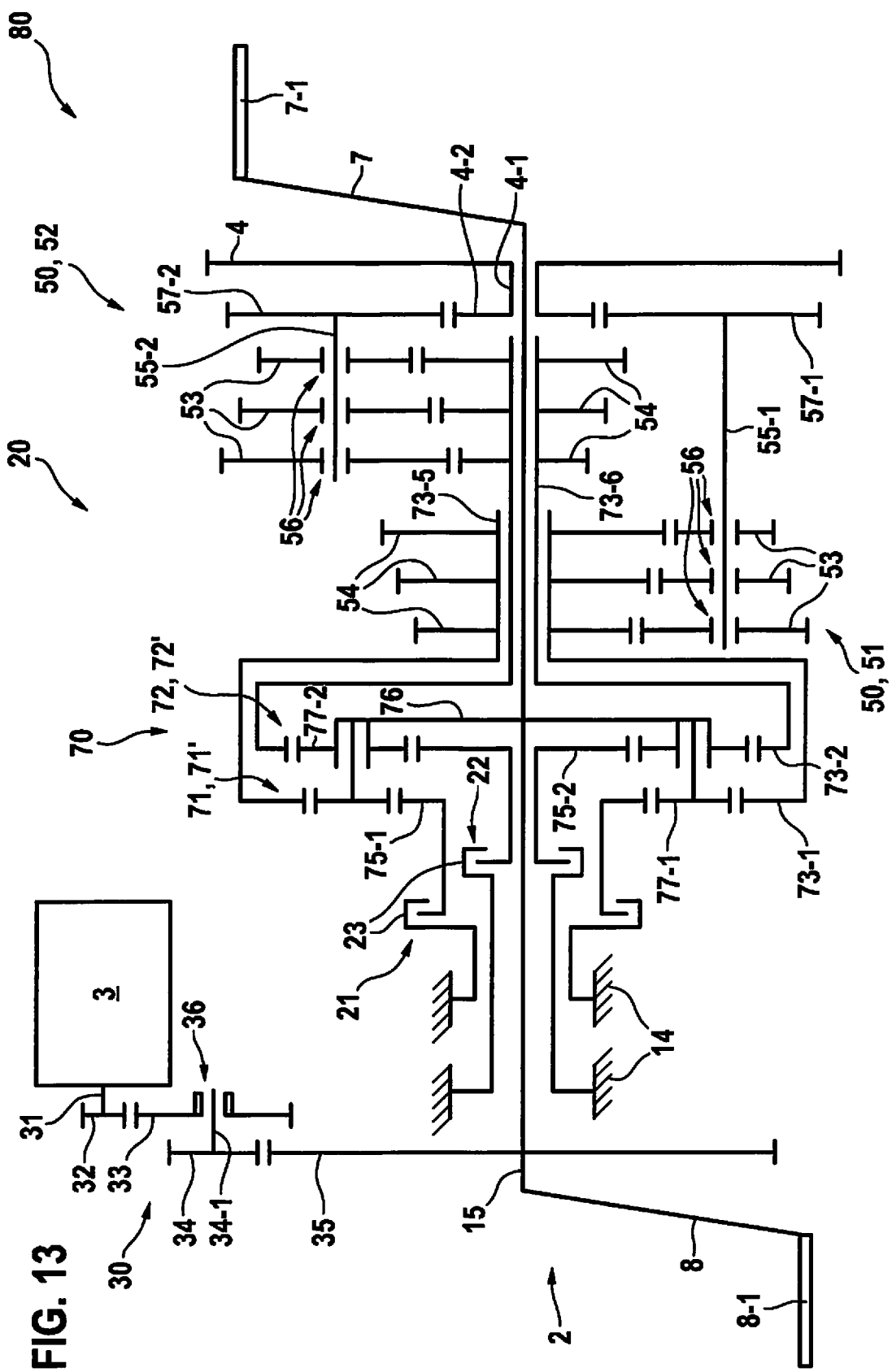

Linkage of a motor 3 to shiftable transmission 50 via a reduction transmission 30 is effected preferably at the input of shiftable transmission 50 either by way of a connection to the common planet carrier 76 (e.g. FIG. 4) of the planetary coupling transmission or as a direct connection, if applicable via a freewheel 36, 49, to the bottom-bracket crank spindle (e.g. FIGS. 3 and 13).

The embodiments in FIGS. 2 and 16 of the drive assemblage according to the present invention will be presented once again below in terms of their essence.

FIG. 2: Drive assemblage 80 according to the present invention constituting a pedelec/e-bike bottom-bracket drive system having an integrated spur gear transmission 50, shiftable with no interruption in tractive energy, constituting a shiftable transmission that is constructed from two sub-transmissions 51, 52. Torque can be transferred from one sub-transmission to the other by way of two actuators 25 having a friction clutch 23 on intermediate shafts 55-1, 55-2 of sub-transmissions 51, 52.

FIG. 3: Configuration of a drive assemblage 80 having an upstream step-up planetary stage 40 in order to reduce the high input torque from the rider.

FIG. 4: Disposition of transmission stages 51, 52 of shiftable spur gear transmission 50 at the transmission output, i.e. facing toward output drive element 4.

FIG. 5: Drive assemblage 80 according to the present invention, in contrast to the embodiment in accordance with FIG. 2, with a brake 24 having a brake shoe 24-1 and a brake disk 24-2 being present instead of a clutch 23 having an actuator 25.

FIG. 6: Embodiment of a shifting actuator system for torque transfer between sub-transmissions 51, 52 having a positioning drive having shifting fingers 61 and a movable shifting gate 66.

FIG. 7: Embodiment of the shifting actuator system for torque transfer between sub-transmissions 51, 52 having two friction clutches 23 on intermediate shafts 55-1, 55-2 of the sub-transmissions, with no linkage via a planetary gearset.

FIG. 8: Embodiment of the shifting actuator system for torque transfer between sub-transmissions 51, 52 having shifting fingers 61 and a shifting gate 66 at the input of both sub-transmissions 51, 52 of shiftable spur gear transmission 50. A coaxial disposition of planetary stages 71', 72' of planetary coupling transmission 70 to bottom-bracket crank spindle 15 exists. A disposition of transmission stages 51, 52 of shiftable spur gear transmission 50 at the transmission input also exists. Common output of the two sub-transmissions. Motor 3 is linked via a reduction transmission 30 on the common planet carrier 76.

FIG. 9: Embodiment of the shifting actuator system for torque transfer between the sub-transmissions having brakes 24, in particular disc brakes, at the input of the two sub-transmissions 51, 52 of shiftable spur gear transmission 50.

Figure 10:
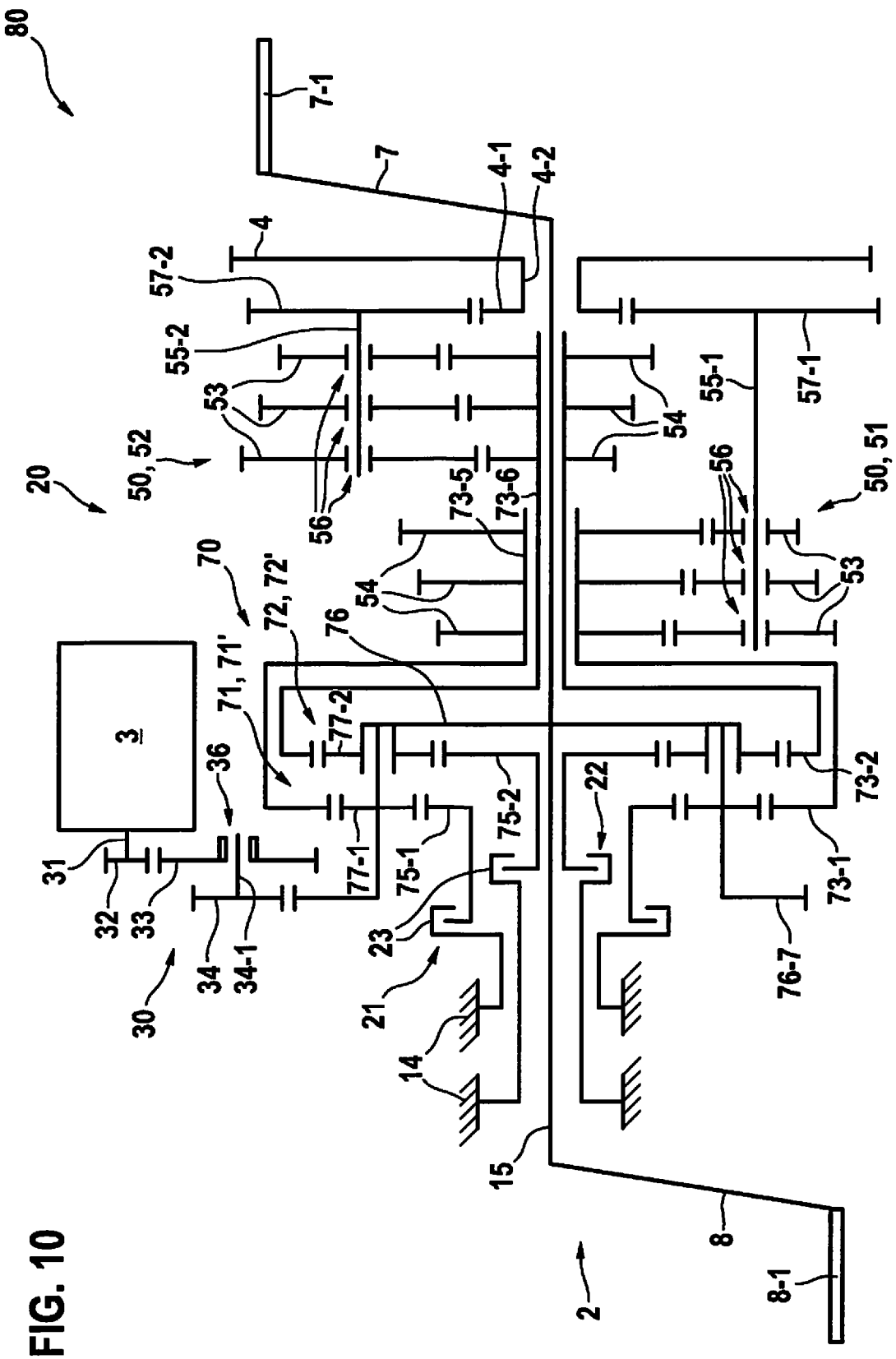

FIG. 10: Embodiment of the shifting actuator system for torque transfer between sub-transmissions 51, 52 having two friction clutches 23 at the input of the two sub-transmissions 51, 52 of shiftable spur gear transmission 50, and having a coaxial disposition of planetary stages 71', 72' of planetary coupling transmission 70 and friction clutches 23 with respect to bottom-bracket crank spindle 15.

FIG. 11: Embodiment having a shifting actuator system for torque transfer between sub-transmissions 51, 52 at the input of the two sub-transmissions 51, 52 of shiftable spur gear transmission 50, with disposition of transmission stages 51, 52 of shiftable spur gear transmission 50 at the transmission output, i.e. facing toward output drive element 4.

FIG. 12: Disposition of transmission stages 51, 52 of shiftable spur gear transmission 50 both at the transmission output and at the transmission input.

FIG. 13: Embodiment having a shifting actuator system for torque transfer between sub-transmissions 51, 52 at the input of the two sub-transmissions 51, 52 of shiftable spur gear transmission 50, and linkage of a motor 3 via a reduction transmission 30 at bottom-bracket crank spindle 15.

Figure 14:
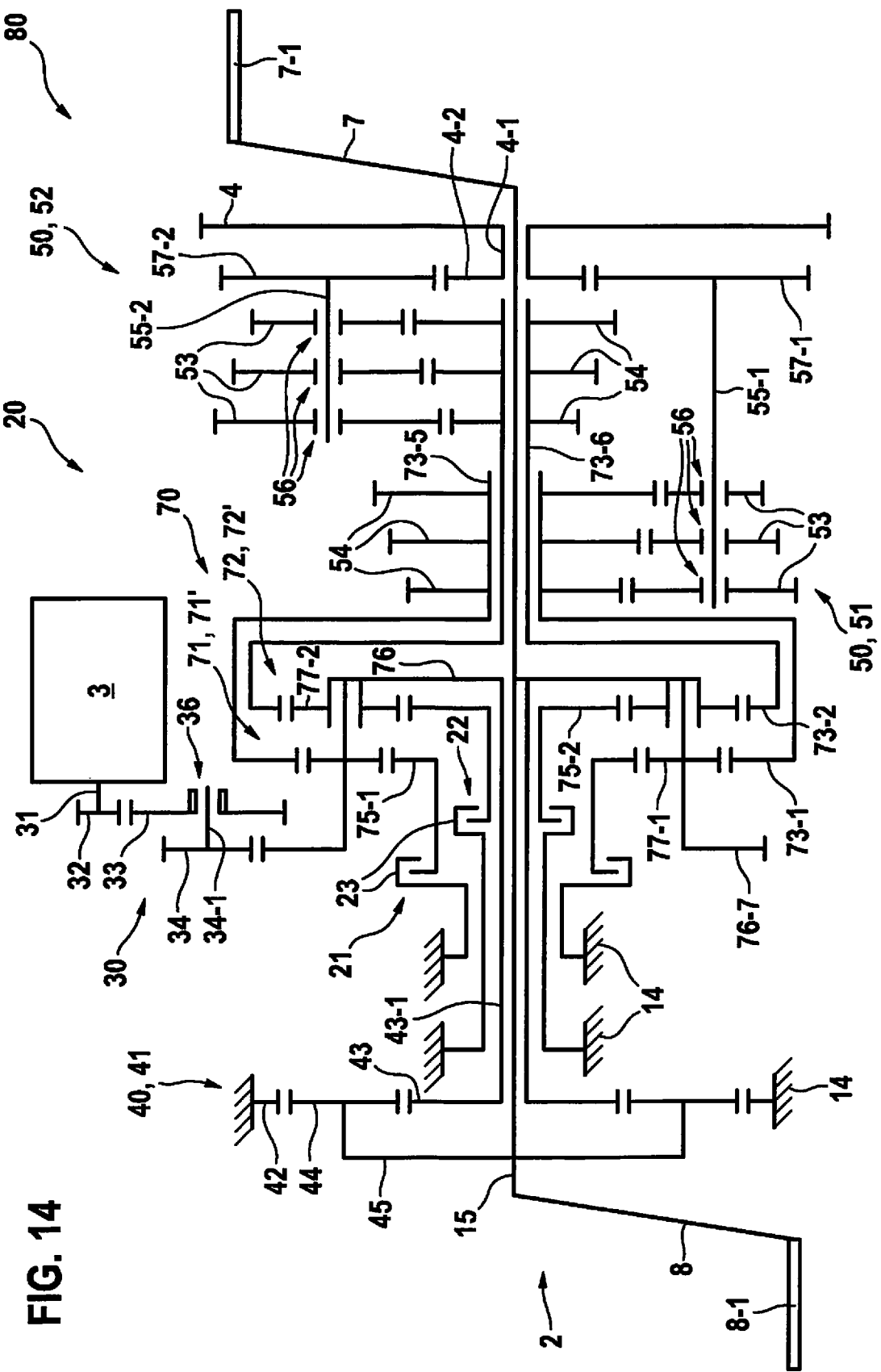

FIG. 14: Embodiment having a shifting actuator system for torque transfer between sub-transmissions 51, 52 at the input of the two sub-transmissions 51, 52 of shiftable spur gear transmission 50, having a configuration with an upstream step-up planetary stage 40 in order to reduce the high input torque from the rider.

FIG. 15: Direct connection of the bottom-bracket crank spindle to the chainring as output drive element 4 via a freewheel 4-3 and with a direct gear ratio 4-4.

FIG. 16: Embodiment of the shifting actuator system for torque transfer between sub-transmissions 51, 52, having two friction clutches 23 at the input of the two sub-transmissions 51, 52 of shiftable spur gear transmission 50 and having a coaxial disposition of friction clutches 23 with respect to bottom-bracket crank spindle 15 and with no linkage via a planetary gearset.

What is claimed is:

1. A drive assemblage for a vehicle drivable by at least one of muscle energy and motor energy, comprising:
    a crank spindle rotatable around a rotation axis and for receiving a first torque; and
    a transfer device for transferring the first torque from the crank spindle to an output drive element couplable to a drive wheel of the vehicle, the transfer device including a shiftable spur gear transmission for a variable conversion ratio, wherein:
    the spur gear transmission includes a first shiftable spur gear transmission and a second shiftable spur gear transmission separate therefrom,
    the first shiftable spur gear transmission and the second shiftable spur gear transmission have a common transmission output to the couplable output drive element, and
    the first shiftable spur gear transmission and the second shiftable spur gear transmission are couplable alternatingly and alternatively into a power and torque flow of the transfer device,
    an electrical drive system to generate a motor torque, wherein the electrical drive system is controllably couplable to the output drive element in order to transfer the motor torque via the transfer device.

2. The driver assemblage as recited in claim 1, wherein the vehicle includes one of an electric bicycle, an e-bike, and a pedelec.

3. The driver assemblage as recited in claim 1, wherein the first torque is generated by muscle energy.

4. The driver assemblage as recited in claim 1, wherein the transfer device is operated automatically.

5. The drive assemblage as recited in claim 1, wherein:
    for alternating and alternative coupling of the first shiftable spur gear transmission and the second shiftable spur gear transmission into the power and torque flow of the transfer device, a first coupling device is associated with the first shiftable spur gear transmission and a second coupling device is associated with the second shiftable spur gear transmission;
    the first coupling device and the second coupling device are actuatable independently of one another and are conveyable at least into a coupled state and into a decoupled state;
    when a respective one of the first coupling device and the second coupling device is in the coupled state, a respectively associated one of the first shiftable spur gear transmission and the second shiftable spur gear transmission is coupled into the power and torque flow of the transfer device; and
    when the respective one of the first coupling device and the second coupling device is in the decoupled state, the respectively associated one of the first shiftable spur gear transmission and the second shiftable spur gear transmission is decoupled from the power and torque flow of the transfer device.

6. The drive assemblage as recited in claim 5, wherein the respective one of the first coupling device and the second coupling device is disposed in the transfer device, with respect to the power and torque flow of the transfer device, one of:
    on an input side and facing away from the output drive element, and
    on an output side and facing toward the output drive element.

7. A drive assemblage for a vehicle drivable by at least one of muscle energy and motor energy, comprising:
    a crank spindle rotatable around a rotation axis and for receiving a first torque; and
    a transfer device for transferring the first torque from the crank spindle to an output drive element couplable to a drive wheel of the vehicle, the transfer device including a shiftable spur gear transmission for a variable conversion ratio, wherein:
    the spur gear transmission includes a first shiftable spur gear transmission and a second shiftable spur gear transmission separate therefrom,
    the first shiftable spur gear transmission and the second shiftable spur gear transmission have a common transmission output to the couplable output drive element, and
    the first shiftable spur gear transmission and the second shiftable spur gear transmission are couplable alternatingly and alternatively into a power and torque flow of the transfer device,
    for alternating and alternative coupling of the first shiftable spur gear transmission and the second shiftable spur gear transmission into the power and torque flow of the transfer device, a first coupling device is associated with the first shiftable spur gear transmission and a second coupling device is associated with the second shiftable spur gear transmission;
    the first coupling device and the second coupling device are actuatable independently of one another and are conveyable at least into a coupled state and into a decoupled state;
    when a respective one of the first coupling device and the second coupling device is in the coupled state, a respectively associated one of the first shiftable spur gear transmission and the second shiftable spur gear transmission is coupled into the power and torque flow of the transfer device; and
    when the respective one of the first coupling device and the second coupling device is in the decoupled state, the respectively associated one of the first shiftable spur gear transmission and the second shiftable spur gear transmission is decoupled from the power and torque flow of the transfer device, wherein the respective one of the first coupling device and the second coupling device includes:
one of a planetary gearset and a part of the planetary gearset, and
is configured for one of:
immobilizing a sun gear of a respective one of the planetary gearset and the part of the planetary gearset nonrotatably with respect to a housing of the drive assemblage for power and torque transfer, in accordance with a coupled state of the respective one of the first coupling device and the second coupling device, and
releasing the one of the planetary gearset and the part of the planetary gearset for free co-rotation with no power and torque transfer, in accordance with a decoupled state of the respective one of the first coupling device and the second coupling device.

8. The drive assemblage as recited in claim 7, wherein: the respective one of the first coupling device and the second coupling device includes, for controlled immobilization and release of the sun gear, an entrainer element coupled nonrotatably to the sun gear, and
the entrainer element is at least one one of:
disposed at least one of radially and axially outside the coupled sun gear, and
disposed respectively on, or as a radially external or outermost portion of, a shifting finger coupled nonrotatably to the respective sun gear.

9. The drive assemblage as recited in claim 8, wherein immobilization and release of the sun gear is executable by way of a positioning drive radially spaced away with respect to at least one of the rotation axis of the crank spindle and the sun gear and positionable in controlled axially parallel fashion, having a plurality of stop elements for immobilizing and releasing the entrainer elements.

10. The drive assemblage as recited in claim 9, wherein the positioning drive is a shift gate.

11. A drive assemblage for a vehicle drivable by at least one of muscle energy and motor energy, comprising:
a crank spindle rotatable around a rotation axis and for receiving a first torque; and
a transfer device for transferring the first torque from the crank spindle to an output drive element couplable to a drive wheel of the vehicle, the transfer device including a shiftable spur gear transmission for a variable conversion ratio, wherein:
the spur gear transmission includes a first shiftable spur gear transmission and a second shiftable spur gear transmission separate therefrom,
the first shiftable spur gear transmission and the second shiftable spur gear transmission have a common transmission output to the couplable output drive element, and
the first shiftable spur gear transmission and the second shiftable spur gear transmission are couplable alternatingly and alternatively into a power and torque flow of the transfer device,
for alternating and alternative coupling of the first shiftable spur gear transmission and the second shiftable spur gear transmission into the power and torque flow of the transfer device, a first coupling device is associated with the first shiftable spur gear transmission and a second coupling device is associated with the second shiftable spur gear transmission;

the first coupling device and the second coupling device are actuatable independently of one another and are conveyable at least into a coupled state and into a decoupled state;
when a respective one of the first coupling device and the second coupling device is in the coupled state, a respectively associated one of the first shiftable spur gear transmission and the second shiftable spur gear transmission is coupled into the power and torque flow of the transfer device; and
when the respective one of the first coupling device and the second coupling device is in the decoupled state, the respectively associated one of the first shiftable spur gear transmission and the second shiftable spur gear transmission is decoupled from the power and torque flow of the transfer device,
wherein the respective one of the first coupling device and the second coupling device includes a clutch and is in interaction with an actuator for controlled actuation of the respective clutch in order to immobilize or release a sun gear of a planetary gearset.

12. The drive assemblage as recited in claim 11, wherein the clutch includes one of a friction clutch and a brake.

13. The drive assemblage as recited in claim 1, wherein the motor torque is transferred via the spur gear transmission.

14. The drive assemblage as recited in claim 1, further comprising:
a motor reduction transmission in the form of a multi-stage spur gear transmission disposed between the electrical drive system and the spur gear transmission.

15. The drive assemblage as recited in claim 14, wherein the motor reduction transmission includes a plastic material.

16. The drive assemblage as recited in claim 14, wherein the drive assemblage exhibits a configuration of a central-motor drive system and encompasses a common housing in which the transfer device, the spur gear transmission including the first and the second shiftable spur gear transmissions, the first and second coupling devices, the electrical drive system, the motor reduction transmission, and at least part of the crank spindle, are received.

17. A vehicle drivable by at least one of muscle energy and motor energy, comprising:
at least one wheel; and
a drive assemblage for driving the at least one wheel and including:
a crank spindle rotatable around a rotation axis and for receiving a first torque; and
a transfer device for transferring the first torque from the crank spindle to an output drive element couplable to a drive wheel of the vehicle, the transfer device including a shiftable spur gear transmission for a variable conversion ratio, wherein:
the spur gear transmission includes a first shiftable spur gear transmission and a second shiftable spur gear transmission separate therefrom,
the first shiftable spur gear transmission and the second shiftable spur gear transmission have a common transmission output to the couplable output drive element, and
the first shiftable spur gear transmission and the second shiftable spur gear transmission are couplable alternatingly and alternatively into a power and torque flow of the transfer device,
an electrical drive system to generate a motor torque, wherein the electrical drive system is controllably couplable to the output drive element in order to transfer the motor torque via the transfer device.

18. A drive assemblage for a vehicle drivable by at least one of muscle energy and motor energy, comprising:
   a crank spindle rotatable around a rotation axis and for receiving a first torque; and
   a transfer device for transferring the first torque from the crank spindle to an output drive element couplable to a drive wheel of the vehicle, the transfer device including a shiftable spur gear transmission for a variable conversion ratio, wherein:
   the spur gear transmission includes a first shiftable spur gear transmission and a second shiftable spur gear transmission separate therefrom,
   the first shiftable spur gear transmission and the second shiftable spur gear transmission have a common transmission output to the couplable output drive element, and
   the first shiftable spur gear transmission and the second shiftable spur gear transmission are couplable alternatingly and alternatively into a power and torque flow of the transfer device,
   for alternating and alternative coupling of the first shiftable spur gear transmission and the second shiftable spur gear transmission into the power and torque flow of the transfer device, a first coupling device is associated with the first shiftable spur gear transmission and a second coupling device is associated with the second shiftable spur gear transmission;
   the first coupling device and the second coupling device are actuatable independently of one another and are conveyable at least into a coupled state and into a decoupled state;
   when a respective one of the first coupling device and the second coupling device is in the coupled state, a respectively associated one of the first shiftable spur gear transmission and the second shiftable spur gear transmission is coupled into the power and torque flow of the transfer device; and
   when the respective one of the first coupling device and the second coupling device is in the decoupled state, the respectively associated one of the first shiftable spur gear transmission and the second shiftable spur gear transmission is decoupled from the power and torque flow of the transfer device,
   wherein the respective one of the first coupling device and the second coupling device is disposed in the transfer device, with respect to the power and torque flow of the transfer device, one of:
   on an input side and facing away from the output drive element, and
   on an output side and facing toward the output drive element.

* * * * *